United States Patent
Jacoby

(10) Patent No.: US 12,214,836 B2
(45) Date of Patent: Feb. 4, 2025

(54) METHOD FOR PRODUCING SHELLS FOR A MOTOR VEHICLE, AND PRODUCTION PLANT

(71) Applicant: Bayerische Motoren Werke Aktiengesellschaft, Munich (DE)

(72) Inventor: Christoph Jacoby, Thallwitz (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 18/685,276

(22) PCT Filed: Oct. 12, 2022

(86) PCT No.: PCT/EP2022/078359
§ 371 (c)(1),
(2) Date: Feb. 21, 2024

(87) PCT Pub. No.: WO2023/078650
PCT Pub. Date: May 11, 2023

(65) Prior Publication Data
US 2024/0367739 A1    Nov. 7, 2024

(30) Foreign Application Priority Data
Nov. 5, 2021 (DE) .................. 10 2021 128 813.4

(51) Int. Cl.
*B62D 65/02* (2006.01)
*B62D 65/18* (2006.01)

(52) U.S. Cl.
CPC .......... *B62D 65/022* (2013.01); *B62D 65/18* (2013.01)

(58) Field of Classification Search
CPC ..... B62D 65/022; B62D 65/18; B23P 21/004; B23P 2700/50; B65G 2201/0294;
(Continued)

(56) References Cited

U.S. PATENT DOCUMENTS 4,894,908 A    1/1990  Haba, Jr. et al.
2017/0015374 A1*  1/2017  Thorwarth ............ B65G 37/00
(Continued)

FOREIGN PATENT DOCUMENTS

DE          40 20 286 A1    1/1992
DE     20 2014 101 003 U1    7/2015
(Continued)

OTHER PUBLICATIONS

International Search Report (PCT/ISA/210) issued in PCT Application No. PCT/EP2022/078359 dated Feb. 9, 2023 with English translation (6 pages).
(Continued)

*Primary Examiner* — Jason L Vaughan
*Assistant Examiner* — Amanda Kreiling
(74) *Attorney, Agent, or Firm* — Crowell & Moring LLP

(57) ABSTRACT

A method produces shells for a motor vehicle, in which, in each case, at least one shell part of the shell is arranged on a driverless transport vehicle and is conveyed through a production plant by way of the driverless transport vehicle. A workstation of the production plant has at least two working regions which can be driven through parallel to one another by the driverless transport vehicles and in which, during a work process, manual work is carried out on one of the shell parts introduced into the working region by way of the driverless transport vehicle and, during a changing process, one of the shell parts arranged on the driverless transport vehicle is introduced into the working region or removed from same by way of the driverless transport vehicle.

8 Claims, 12 Drawing Sheets

(58) Field of Classification Search
CPC ........ B65G 37/00; B65G 35/06; B65G 17/12; B23Q 7/1426; Y10T 29/53048; Y10T 29/53365; Y10T 29/5337
See application file for complete search history.

(56) References Cited

U.S. PATENT DOCUMENTS

2019/0329982 A1* 10/2019 Gümbel ................ B65G 69/20
2020/0130115 A1    4/2020 Vetter et al.

FOREIGN PATENT DOCUMENTS

DE   10 2017 103 931 A1   8/2018
DE   10 2019 206 491 A1   11/2020
EP        3 079 978 B1    4/2020

OTHER PUBLICATIONS

German-language Written Opinion (PCT/ISA/237) issued in PCT Application No. PCT/EP2022/078359 dated Feb. 9, 2023 with English translation (8 pages).
German-language Search Report issued in German Application No. 10 2021 128 813.4 dated Jun. 28, 2022 with partial English translation (14 pages).

* cited by examiner

METHOD FOR PRODUCING SHELLS FOR A MOTOR VEHICLE, AND PRODUCTION PLANT

BACKGROUND AND SUMMARY

The invention relates to a method for producing shells for a motor vehicle. The invention furthermore relates to a production plant for producing shells for a motor vehicle.

EP 3 079 978 B1 discloses a transport vehicle for transporting workpieces during the production thereof. The transport vehicle comprises a trolley, by means of which the transport vehicle and a workpiece disposed thereon is movable as a whole, and a workpiece receiving device for receiving the workpiece. The trolley is at least approximately C-shaped, wherein the trolley of the transport vehicle has two limbs which are connected to each other by means of a connecting part, wherein each limb of the transport vehicle in each case comprises at least one handling device for moving the workpiece or at least part of the workpiece relative to the trolley.

It is the object of the invention to provide a method for producing shells for a motor vehicle and a production plant for producing shells for a motor vehicle, such that the shells can be produced particularly cost-effectively.

This object is achieved according to the invention by a method for producing shells for a motor vehicle and by a production plant for producing shells for a motor vehicle in accordance with the independent claims. Advantageous refinements of the invention are the subject matter of the dependent claims and the description.

A first aspect of the invention relates to a method for producing shells for a motor vehicle or motor vehicles. The motor vehicle is preferably in the form of a passenger vehicle, utility vehicle or truck.

The respective shell is preferably in the form of an, in particular self-supporting, body. In its fully produced state, the motor vehicle has the shell or, in their respective fully produced state, the motor vehicles have the respective shell. The body may be referred to or designed in particular as the body in white.

The production of the shells can be understood as meaning in particular at least a partial step or at least a partial process of the production of the shells. The method can therefore be referred to in particular as a method for at least partially producing shells. This means that, at the beginning or prior to the beginning of the method, the respective shell is not in its fully produced state, whereas, at the end of the method or after the method has been carried out, the respective shell may be in its fully produced state. Alternatively, at the end of the method or after the method has been carried out, the respective shell may not be in its fully produced state, with progress of the production of the body shell being further advanced than before the beginning of the method. This means that, after the end of the method, further production steps, which can be carried out separately from the method, for producing the shell may still be required, in order to fully produce the respective shell such that the respective shell is in its fully produced state.

In the method, it is provided that at least one respective shell part of the respective shell is disposed at, in particular on, a respective driverless transport vehicle (FTF) and is conveyed through a production plant by means of the respective driverless transport vehicle. Expressed in other words, the respective shell part is transported through the production plant by means of the respective driverless transport vehicle, as a result of which the respective shell part, which is disposed in particular on the respective driverless transport vehicle, passes through the production plant.

This means that the production plant comprises a plurality of the driverless transport vehicles. One, in particular precisely one, of the shell parts can be disposed or can be fastened on the respective transport vehicle. For this purpose, the respective driverless transport vehicle has, for example, a receiving device, in particular a receiving surface, on or at or to which the respective shell part can be disposed, in particular can be fastened, or is disposed, in particular fastened. The respective shell part can therefore be held on the respective driverless transport vehicle.

Disposing the respective shell part on the respective driverless transport system can be understood as meaning in particular that the respective shell part is placed onto the respective driverless transport system.

The respective shell part can be understood as meaning in particular a component of the respective shell or an assembly of the respective shell. The fact that at least the respective shell part is disposed at or on the respective driverless transport vehicle can be understood as meaning in particular that the respective, in particular complete, respective shell is disposed at or on the respective driverless transport vehicle. The respective, in particular complete, shell can therefore be conveyed through the production plant by means of the respective driverless transport vehicle.

The production plant can be understood as meaning in particular an apparatus for, in particular at least partially, producing the shells. This means that the shells are, in particular at least partially, produced while the shells are in the production plant.

Preferably, the, in particular at least partial, production of the shells is carried out partially automatically or in a partially automated manner by means of or in the production plant. For this purpose, the respective driverless transport vehicle can be provided in order to drive the respective shell part automatically or in an automated manner through the production plant. For example, the production plant comprises automatic or automated tool devices, by means of which the respective shell part is produced in a partially automated manner or automatically. The automatic or automated tool device can be understood as meaning, for example, a robot, which is referred to in particular as a production robot.

The respective driverless transport vehicle can be understood as meaning in particular a respective, in particular floor-bound, conveying means which has a traction drive, wherein the respective driverless transport vehicle is automatically controlled and is guided, in particular contactlessly. The respective traction drive can be understood as meaning in particular a drive device of the respective driverless transport vehicle, wherein the respective driverless transport vehicle can be driven or is driven by means of its respective drive device. The drive device is preferably an electric machine.

The automatic controlling of the respective driverless transport vehicle can be understood as meaning in particular that the respective driverless transport vehicle is controlled fully automatically or autonomously. Therefore, the respective driverless transport vehicle is preferably not controlled manually. This means that the controlling of the respective driverless transport vehicle by a person or a driver is omitted.

The respective driverless transport vehicle is preferably provided for transporting material, for example the respective shell part. The respective driverless transport vehicle is preferably not provided for transporting people. This means that the transporting of people by means of the respective driverless transport vehicle is omitted.

The respective driverless transport vehicle preferably has a plurality of, for example four, ground contact elements. The ground contact elements are preferably wheels of the driverless transport vehicle, wherein the wheels are rotatable or are rotated relative to a roadway of the production plant, as a result of which the respective driverless transport vehicle can drive on the roadway and can thereby move through the production plant. Preferably, at least one of the ground contact elements, in particular two or four of the ground contact elements, is or are connected or is or are connectable by means of the drive device of the driverless transport vehicle in a manner transmitting torque, as a result of which the ground contact element can be driven by means of the drive device.

For example, a first of the respective shell parts is arranged at or on a first of the respective driverless transport vehicles. For example, a second of the respective shell parts, which is formed separately from the first shell part, is disposed at or on a second of the driverless transport vehicles, which is formed separately from the first driverless transport vehicle. For example, a third of the shell parts, which is formed separately from the first and the second shell part, is disposed at or on a third of the driverless transport vehicles, which is formed separately from the first and the second driverless transport vehicle.

Preferably, the respective driverless transport vehicle, in particular when conveying the respective shell part through the production plant, drives through an, in particular predefined or predetermined, travel section. This means that the production plant has the travel section on which the driverless transport vehicles can drive, in particular in a targeted manner, through the production plant. The travel section can be understood as meaning in particular a travel distance or a travel route.

In order to be able to produce the shells particularly cost-effectively, it is provided according to the invention that a workstation of the production plant has at least two working regions which can be driven through parallel to one another by the driverless transport vehicles. Expressed in other words, the working regions are arranged parallel to one another, with respect to a driving direction of the respective driverless transport vehicle when driving through the respective working region, as a result of which the working regions can be driven through in parallel or are driven through parallel by the driverless transport vehicles.

For example, the travel section has at least two length regions which can be driven through in parallel by the driverless transport vehicles, wherein a first of the length regions runs through the first of the working regions, in particular bypassing a second of the working regions, and a second of the length regions runs through the second working region, in particular bypassing the first working region.

In addition, it is provided that, in the working regions, in each case during a respective working process, at least one item of manual work, in particular manual work, is carried out, in particular at least partially, on one of the respective shell parts introduced into the respective working region by means of the respective driverless transport vehicle and disposed in particular at or on the respective driverless transport vehicle and, during a respective changing process, one of the respective shell parts disposed on the respective driverless transport vehicle is introduced into and/or removed from the respective working region by means of the respective driverless transport vehicle. Expressed in other words, the working process and the changing process can be carried out in the respective working region, wherein, when the changing process is being carried out, the shell part disposed on the respective driverless transport vehicle is introduced into the respective working region by means of the respective driverless transport vehicle and/or is removed from the respective working region and, during the respective working process, the manual work is carried out on the respective shell part, which is disposed in particular at or on the respective driverless transport vehicle, while the respective shell part is located, in particular together with the respective driverless transport vehicle, in the respective working region.

Introducing the respective shell part of the respective driverless transport vehicle into the respective working region can be understood as meaning in particular that the respective shell part, which is disposed on the respective driverless transport vehicle, is driven into the respective working region by means of the respective driverless transport vehicle. Removing the respective shell part or the respective driverless transport vehicle from the respective working region can be understood as meaning in particular that the respective shell part, which is disposed on the respective driverless transport vehicle, is removed from or driven out of the respective working region by means of the respective driverless transport vehicle. The fact that the respective shell part or the respective driverless transport vehicle is located in the respective working region can be understood as meaning in particular that the respective shell part or the respective driverless transport vehicle is disposed in the respective working region.

In addition, it is provided that, while the working process is being carried out in the first working region, the changing process is carried out in the second working region, and vice versa. Expressed in other words, while the working process is being carried out in the first working region, the changing process is carried out in the second working region, wherein, while the changing process is being carried out in the first working region, the working process is carried out in the second working region. Again in other words, in the first working region, the manual work is carried out on the respective shell part, which is introduced into the first working region by means of the respective driverless transport vehicle and is disposed in particular on the respective driverless transport vehicle, while, in the second working region, the respective shell part, which is disposed on the respective transport vehicle, is introduced into the second working region by means of the respective driverless transport vehicle and/or is removed from the second working region. In the second working region, the manual work is carried out on the respective shell component, which is introduced into the second working region by means of the respective driverless transport vehicle and is disposed in particular on or at the respective driverless transport vehicle, while, in the first working region, the respective shell part, which is disposed on the respective transport vehicle, is introduced into the first working region and/or is removed from the first working region by means of the respective driverless transport vehicle.

For example, in the case of the second shell part, which is introduced into the first working region by means of the second driverless transport vehicle and is disposed in particular on the second driverless transport vehicle, the manual work is carried out while the first shell part, which is disposed on the first driverless transport vehicle, is removed from the second working region by means of the first driverless transport vehicle, and/or the third shell part, which is disposed on the third driverless transport vehicle, is introduced into the second working region by means of the third driverless transport vehicle. Subsequently, for example, the second shell part, which is disposed on the second driverless transport vehicle, is removed from the first working region by means of the second driverless transport vehicle while the manual work is being carried out on the third shell part, which is introduced into the second working region by means of the third driverless transport vehicle and is disposed in particular on the third driverless transport vehicle.

The respective working process can be understood as meaning in particular a respective production step for producing the shells. The manual work can be understood as meaning in particular at least one manual activity. This means that the work or the activity is carried out at least partially, in particular completely, manually, that is, by or by means of at least one person. The manual work or the manual activity is preferably a respective activity, by means of which the at least partial production of the respective shell part can be brought about or is brought about.

The respective manual work can take place partially automatically or in an automated manner. This means that the respective manual work comprises a first working step, which is carried out, in particular completely, manually, and a second working step which is different from the first working step and is carried out at least partially, in particular completely, in an automated manner or automatically.

During or by means of the changing process, the respective working region is prepared, in particular by the introduction of the respective shell part, which is disposed on the respective driverless transport vehicle, in such a manner that the working process can subsequently be carried out. The changing process can therefore in particular be referred to as, or understood as meaning, an equipping process.

A cycle time of the respective shell part can comprise a movement time and a standstill time of the respective shell part or can be broken down into the movement time and the standstill time. The movement time can be understood as meaning in particular a period of time for carrying out the changing process. This means that the movement time can be a duration of the changing process. The standstill time can be understood as meaning in particular a period of time in which the respective shell part is disposed in the working station, in particular in the respective working region. The standstill time can therefore be understood as meaning in particular a period of time of the working process. This means that the standstill time can be a duration of the working process. Therefore, the standstill time can be understood as meaning in particular a net working time of at least one person carrying out the manual work and therefore the working process.

The invention is based in particular on the following findings and considerations: in principle, it is conceivable to convey the shell parts or the shells through the production plant by means of belt conveyors. By contrast, in the case of the method according to the invention, the shell parts are conveyed through the production plant by means of the driverless transport vehicles. As a result, the shell parts can be conveyed particularly flexibly through the production plant. Costs referred to in particular as production costs for producing the shells can thereby be kept particularly low.

In principle, it is conceivable that the work station can be driven through in series by the driverless transport vehicles. This means that, for example, it is possible for only one, in particular precisely one, working region of the workstation to be provided, which can be driven through or is driven through by the respective driverless transport vehicles one after another. Therefore, in the case of a conventional method, it can be provided that the working process is carried out on a respective shell part and then the respective shell part is removed from the working region and the next respective shell part is introduced into the working region, wherein, subsequently, the working process is carried out with the next shell part introduced into the respective working region. In such a conventional method, it can therefore be provided that the people who are referred to in particular as employees and carry out the manual work may be without activity while the changing process is carried out. This means that the employee waits while the changing process is being carried out for the respective changing process to be finished in order to be able to carry out the manual work. Expressed in other words, the movement time cannot be used productively by the employee. That is to say, the employee cannot carry out any or their activity during the movement time. For example, in the case of the conventional method, the movement time is circa 30% of the cycle time. Therefore, the efficiency of such a conventional method is particularly low. This means that the production costs for producing the shells by means of the conventional method can be particularly elevated.

By contrast, in the case of the method according to the invention, the changing process is already being carried out as the employee or the person carries out the working process. This means that the movement time can be used effectively or productively by the person for the work since, during the moving time, the standstill time of the shell part disposed in the respective other working region can be used for carrying out the manual work. As a result, the efficiency of the method or the efficiency for producing the shells can be particularly increased. The shells can thus be produced particularly cost-effectively by means of the method according to the invention. This means that the production costs can be kept particularly low. As a result, effective utilization of the working time, referred to in particular as employee working time, of the employees used in the production plant can be increased from, for example, 70 percent to, for example, more than 90 percent.

The use of the driverless transport vehicles means that the production plants can be configured particularly flexibly. For example, the production plant can be expanded as desired, as a result of which a production concept for producing the shells by means of the production plant can be expanded as desired. For example, in particular depending on requirements, finishing regions and/or special working regions can be approached by the driverless transport vehicles, thus enabling further work to be carried out on the respective shell part in the finishing regions or the special working regions, in particular to meet requirements. This can take place in particular independently of the structural layout of the production plant, the production plant being able to have the structural layout in a production hall.

It is preferably provided that the respective shell part or the respective driverless transport vehicle is at a standstill while the respective working process is being carried out. Expressed in other words, the respective shell part arranged on the respective driverless transport vehicle is not moved relative to the workstation or the roadway while the manual work is being carried out on the respective shell part. This means that the respective relative movement with respect to the workstation or the roadway of the respective driverless transport vehicle, on which the respective shell part is disposed, is stopped while the manual work is being carried out on the respective shell part.

In a further refinement, it is provided that the respective working process is an assembly process, in which, in the respective working region, at least one component formed separately from the respective shell part is fastened to the respective shell part, which is introduced into the respective working region by means of the respective driverless transport vehicle, in particular is disposed at or on the respective driverless transport vehicle. Expressed in other words, in the working process, the component, which is referred to in particular an add-on part, is connected to the respective shell part while the respective shell part or the respective driverless transport vehicle, on which the respective shell part is disposed, is located in the respective working region. The assembly process can thereby be carried out particularly efficiently. The shells can therefore be produced particularly cost-effectively.

For example, the assembly process is a screwing process, in which, in the respective working region, on the respective shell, which is introduced into the respective working region by means of the respective driverless transport vehicle, in particular is disposed at or on the respective driverless transport vehicle, the at least one component formed separately from the respective shell part is screwed to the shell part. This means that the component or the add-on part and the shell component are connected to one another during the working process by means of screwing. The shell part and the add-on part are preferably screwed together by means of a plurality of screws, for example two or three screws. Expressed in other words, in the assembly process or the screwing process, preferably two or three screws are set. For example, the shell part comprises a side wall and/or an A pillar, the add-on part being screwed to the A pillar and/or the side wall. For example, the component is a flap or a door of the motor vehicle or of the body.

Alternatively or additionally, the respective working process is an assembly process, in which, in the respective working region, at least two structural elements, which are formed separately from each other, of the respective shell part, which is introduced into the respective working region by means of the respective driverless transport vehicle, in particular is disposed at or on the respective driverless transport vehicle, are connected to each other, in particular by means of screws. The structural elements can be two respective parts formed separately from each other or partial regions of the shell part. For example, a first of the structural elements is the A pillar. For example, the second of the structural elements is the side wall.

The assembly process preferably takes place in a partially automated manner. For example, the shell part and the component are automatically connected to each other, in particular screwed, with respective fastening points, in particular screwing points, at which the component is fastened to the respective shell part, being set manually.

It is preferably provided that apparatuses, by means of which the manual work can be carried out or is carried out, are equipped automatically or in an automated manner, in particular while the changing process is being carried out in the respective working region. The apparatus can be understood as meaning in particular a tool, for example an assembly tool. The equipping can be understood as meaning, for example, configuring the apparatus.

In a further embodiment, it is provided that a second workstation of the production plant, which second workstation is spaced apart from the workstation, has at least two working areas which can be driven through parallel to one another by the driverless transport vehicles. Expressed in other words, the working areas are arranged parallel to one another with respect to a driving direction of the respective driverless transport vehicle as it passes through the respective working area, as a result of which the working areas can be driven through in parallel or are driven through in parallel by the driverless transport vehicles.

For example, the travel section has at least two section portions which can be driven through in parallel by the driverless transport vehicles, wherein a first of the travel portions runs through the first of the working areas, in particular bypassing a second of the working areas, and a second of the travel portions runs through the second working area, in particular bypassing the first working area.

In the working areas, in each case during a respective second working process different from the working process, second manual work, in particular manual work, is carried out, in particular at least partially, on one of the respective shell parts, which is introduced into the respective working area by means of the respective driverless transport vehicle, in particular is disposed at or on the respective driverless transport vehicle and, during a respective second changing process, one of the respective shell parts, which is disposed on the respective driverless transport vehicle, is introduced into and/or removed from the respective working area by means of the respective driverless transport vehicle. Expressed in other words, in the respective working area, the second working process and the second changing process can be carried out, wherein, while the second changing process is being carried out, the shell part, which is disposed on the respective driverless transport vehicle, is introduced into the respective working area and/or is removed from the respective working area by means of the respective driverless transport vehicle, and, in the respective further working process, the second manual work is carried out on the respective shell part, which is disposed in particular at or on the respective driverless transport vehicle, while the respective shell part, in particular together with the respective driverless transport vehicle, is located in the respective working area.

While the second working process is carried out in the first working area, the second changing process is carried out in the second working area, and vice versa. Expressed in other words, while the second working process is being carried out in the first working area, the second changing process is carried out in the second working area, wherein, while the second changing process is being carried out in the first working area, the second working process is carried out in the second working area. Again in other words, in the first working area, the manual second work is carried out on the respective shell part, which is introduced into the first working area by means of the respective driverless transport vehicle, in particular is disposed on the respective driverless transport vehicle, while, in the second working area, the respective shell part, which is disposed on the respective transport vehicle, is introduced into the second working area and/or is removed from the second working area by means of the respective driverless transport vehicle. In the second working area, the second manual work is carried out on the respective shell part, which is introduced into the second working area by means of the respective driverless transport vehicle, in particular is disposed on or at the respective driverless transport vehicle, while, in the first working area, the respective shell part, which is disposed on the respective transport vehicle, is introduced into the first working area and/or is removed from the first working area by means of the respective driverless transport vehicle.

As a result, at least one person carrying out the second manual work can carry out the second working process on the respective shell part, which is disposed in the first working area, while the changing process is being carried out in the second working area, and vice versa. As a result, the effective utilization of the person carrying out the second working process can be particularly increased. The shells can thereby be produced particularly cost-effectively.

For example, the second manual work is carried out in the case of the second shell part, which is introduced into the first working area by means of the second driverless transport vehicle, in particular is disposed on the second driverless transport vehicle, while the first shell part, which is disposed on the first driverless transport vehicle, is being removed from the second working area by means of the first driverless transport vehicle and/or the third shell part, which is disposed on the third driverless transport vehicle, is being introduced into the second working area by means of the third driverless transport vehicle. Subsequently, for example, the second shell part, which is disposed on the second driverless transport vehicle, is removed from the first working area by means of the second driverless transport vehicle while the second manual work is being carried out on the third shell part, which is introduced into the second working area by means of the third driverless transport vehicle, in particular is disposed on the third driverless transport vehicle.

It is preferably provided that the respective second working process is a finishing process, in which, in the respective working area, at least one detected production error, in particular surface error, on the respective shell part, which is introduced into the respective working area by means of the respective driverless transport vehicle, in particular disposed at or on the respective driverless transport vehicle, is corrected. Expressed in other words, in the case of the second manual work, the production error, in particular the surface error, of the shell part, which is disposed in the respective working area, is corrected or eliminated. As a result, the finishing process can be carried out particularly efficiently. This means that the effective utilization of the employee working time during the finishing process can be particularly increased. The shells can thereby be produced particularly cost-effectively.

The production error of the respective shell part can be understood as meaning in particular a deviation of the respective shell part from an, in particular predefined, desired state of the respective shell part. Therefore, a respective actual state of the respective shell part differs from the respective desired state of the respective shell part if the respective shell part has the production error. Preferably, the respective actual state of the respective shell part corresponds to the respective desired state of the respective shell part when the respective shell part is free from the production error or does not have the production error.

The surface error can be understood as meaning in particular a deviation of a surface of the respective shell part from a desired state of the surface of the respective shell part. An actual state of the surface of the respective shell part therefore differs from a desired state of the surface of the respective shell part if the surface of the respective shell part has the surface error. Preferably, the actual state of the surface of the respective shell part corresponds to the desired state of the surface of the respective shell part if the surface of the respective shell part is free from the surface error or does not have the surface error.

Correction of the production error or of the surface error can be understood as meaning in particular finishing of the production error or of the surface error. This means that the respective shell part is free from the production error or the surface error as a result of the correction or after the correction, or the production error, in particular the surface error, is located within a predefined tolerance range.

In a further refinement, it is provided that, in the finishing process, in the respective working area, the production error or the surface error on the respective shell part, which is introduced into the respective working area by means of the respective driverless transport vehicle, in particular is disposed at or on the respective driverless transport vehicle, is detected, in particular manually detected. Expressed in other words, the finishing process comprises the, in particular manual, detection of the production error, in particular of the surface error. This means that, in the finishing process, in the respective working area, the production error or the surface error is detected, in particular manually, on the respective shell part, which is introduced into the respective working area by means of the respective driverless transport vehicle, wherein, subsequently, the production error, in particular surface error, detected, in particular manually, in the respective working area, is corrected. As a result, the detection and the correction in the respective working area can be carried out particularly efficiently. The shells can thereby be produced particularly cost-effectively.

Detection of the production error, in particular of the surface error, can be understood as meaning in particular determining the production error, in particular the surface error.

Preferably, it is provided that the respective shell part is located in the respective working area between the, in particular manual, detection of the production error, in particular of the surface error, and the correction of the production error, in particular the surface error. This means that, after the, in particular manual, detection of the production error, in particular of the surface error, the removal of the respective shell part from the respective working area by means of the respective driverless transport vehicle is stopped until the production error, in particular the surface error, in the respective working area has been corrected or eliminated.

The detection of the production error, in particular of the surface error, may be referred to in particular as a surface check. The finishing process may therefore comprise the surface check.

Preferably, the second work station is disposed downstream of the work station with respect to a driving direction of the driverless transport vehicle is provided in the production plant, as a result of which the driverless transport vehicles driving through the production plant drive through the workstation into the second work station. Expressed in other words, the driverless transport vehicles, as they drive through the production plant, in particular in the driving direction, first of all drive through the work station, wherein the transport vehicles driving through the workstation subsequently drive through the second work station. Expressed again in other words, the second workstation is disposed downstream of the work station on the travel section of the driverless transport vehicles, in particular with respect to the driving direction.

In a further embodiment, it is provided that the respective shell part, which is disposed on the respective driverless transport vehicle, is introduced by means of the respective driverless transport vehicle into an inspection region of the production plant formed separately from the working region and from the second working region, wherein the production error, in particular the surface error, on the respective shell part, which is introduced into the inspection region, is automatically detected. Expressed in other words, the production plant has the inspection region, which is spaced apart in particular from the working region and the second working region, wherein, in the inspection region, the production error, in particular the surface error, is automatically detected while the shell part, which is disposed in particular on the respective driverless transport vehicle, is located in the inspection region. Again in other words, the surface check comprises the automatic detection of the production error, in particular of the surface error, wherein the surface check is at least partially, in particular completely, carried out in the inspection region of the production plant. By means of the automatic detection, the production error, in particular the surface error, can be detected particularly reliably and/or particularly cost-effectively, in particular with a particular saving on time. The shells can thereby be produced particularly cost-effectively. The inspection region may be referred to in particular as a check region or a detection region.

Preferably, the automatic detection of the production error, in particular of the surface error, in the inspection region takes place while the shell part, which is disposed in particular on the respective driverless transport vehicle, is at a standstill. This means that the respective shell part or the respective driverless transport vehicle, on which the respective shell part is disposed, is not moved relative to the roadway or at least one production plant wall, which at least partially delimits the inspection region, during the automatic detection. Therefore, the movement of the respective shell part relative to the wall or the roadway can be stopped while the production error, in particular the surface error, is automatically detected.

Alternatively, the production error, in particular the surface error, can be automatically detected in the inspection region while the driverless transport vehicle, on which the respective shell part is disposed, drives through the inspection region. This means that the production error, in particular the surface error, can be automatically detected in the inspection region while the respective shell part is moved relative to the wall or the roadway by means of the respective driverless transport vehicle.

For example, the inspection region has at least one optical detection device, by means of which the production error, in particular the surface error, can be automatically detected. For this purpose, the respective shell part is introduced into a detection region of the optical detection device or disposed in the detection region, for example, by means of the respective driverless transport vehicle. For example, the optical detection device is a camera.

In a further refinement, it is provided that, in the finishing process, the respective production error detected in the inspection region is corrected. Expressed in other words, in the finishing process, in the respective working area, the production error, in particular surface error, which is detected in the inspection region, on the respective shell part, which is introduced into the respective working area by means of the respective driverless transport vehicle, in particular is disposed at or on the respective driverless transport vehicle, is corrected. This means that the surface check takes place in the inspection region, and the finishing process, which is referred to in particular as finishing work, takes place in the second workstation, in particular in the respective working area. As a result, the production error, in particular the surface error, can be detected particularly efficiently, in particular automatically, and can also be corrected particularly efficiently.

Preferably, the inspection region is arranged upstream of the workstation with respect to the driving direction of the driverless transport vehicles, as a result of which the driverless transport vehicles drive through the inspection region to the workstation, in particular to the working regions. This means that the driverless transport vehicles first of all drive through the inspection region, wherein the driverless transport vehicles driving through the inspection region subsequently drive through the workstation, in particular the respective working region. Expressed in other words, the inspection region is arranged upstream of the working region, in particular with respect to the driving direction, on the travel section.

Preferably, the second workstation has more working areas than the workstation has working regions. This means that a first number of working regions of the workstation is preferably smaller than a second number of working areas of the second work station. The second number is preferably double or three times as high as the first number. This means that the second workstation can comprise double or three times as many working areas than the workstation comprises working regions.

As a result, in particular the following advantages are obtained: an extent of or an effort for the correction of the production errors, in particular of the surface errors, in the second workstation depends, for example, on the type and extent of the detected production errors, in particular surface errors. Conventionally, in the case of the shell parts, the type and extent of the production errors, in particular the surface errors, may differ. This means that some shell parts may be error-free and other shell parts may be error-affected, wherein the respective production error, in particular the respective surface error, of the other shell parts may differ from one another, in particular in respect of type and/or extent. This means that, before the production errors, in particular the surface errors, are detected, it is frequently not possible to predict the extent to which the production errors, in particular the surface errors, have been corrected or are corrected. Therefore, in the case of some shell parts, a correction time required for correcting the production errors, in particular the surface errors, may be higher than in the case of other shell parts, which are, for example, error-free or their respective production error is smaller or less pronounced, for example, in respect of its type and/or in respect of its extent. By contrast thereto, in each case identical or similar manual work can be conventionally carried out on the shell parts in the respective working region. A working time for carrying out the manual work in the first work station can therefore be conventionally identical or similar for the shell parts. In particular as a result of the fact that the number of the working areas is greater than the number of the working regions, the finishing time per shell part can be higher than the working time of the manual work per shell part without this having a negative effect on a throughput of the shell parts through the workstation or the production plant. In addition, the respective shell parts, which are disposed on the respective driverless transport vehicles, may overtake one another in the second working station. For example, a respective shell part, the correction time of which for correcting the production error, in particular the surface error, is particularly long, is disposed in one of the respective working areas, wherein then, in the remaining working areas, the second working processes and the second changing processes can be carried out while, in the one working area, the second working process continues to proceed. It can therefore be prevented that the particularly long correction time has a particularly negative effect on the throughput of the shell parts through the production plant, in particular through the workstation and/or the second work station. The respective working areas can therefore mutually act as buffers. As a result, the throughput of the shell parts through the production plant, in particular the workstation and/or the second workstation, can be kept particularly high. The shell parts can thereby be produced particularly efficiently.

Expressed in other words, by means of the use of the driverless transport vehicles, in particular by means of the higher number of working areas, the efficiency of the production plant can be particularly increased since, by contrast with the conventional method, the driverless transport vehicles do not drive with respect to one another in the manner of a string of pearls, but rather may overtake one another in the second workstation if the finishing effort at one of the respective shell parts is particularly high or particularly low.

A second aspect of the invention relates to a production plant for producing shells for a motor vehicle. Advantages and advantageous refinements of the first aspect of the invention should be considered to be advantages and advantageous refinements of the second aspect of the invention, and vice versa.

The production plant comprises a plurality of driverless transport vehicles at or on which at least one respective shell component of the respective shell can be disposed for conveying the respective shell component through the production plant. The respective shell parts can therefore be transported through the production plant by means of the respective driverless transport vehicle.

The production plant has at least one workstation which has at least two working regions which can be driven through parallel to one another by the driverless transport vehicles. In the working regions, in each case during a respective working process, at least one item of manual work can be carried out, in particular at least partially, on one of the respective shell parts, which is introduced into the respective working region by means of the respective driverless transport vehicle, in particular is disposed at or on the respective driverless transport vehicle, and, during a respective changing process, one of the respective shell parts, which is disposed on the respective driverless transport vehicle, can be introduced into, in particular can be driven into, or can be removed, in particular can be taken out, from the respective working region by means of the respective driverless transport vehicle. The work station is configured in such a manner that, while the working process can be carried out in the first working region, the changing process can be carried out in the second working region, and vice versa. Expressed in other words, while the working process can be carried out in the first working region, the changing process can be carried out in the second working region, and while the changing process can be carried out in the first working region, the working process can be carried out in the second working region.

The workstation is preferably in the form of a double box. This can be understood as meaning in particular that the workstation has two partial regions referred to in particular as halves. A first of the halves comprises the first working region and the second of the halves comprises the second working region. Therefore, the changing process takes place in the first half while the working process is carried out in the second half, or the working process is carried out in the first half while the changing process is carried out in the second half.

In a further refinement, it is provided that the respective working region has a respective passage region which can be driven through in a driving direction by the respective driverless transport vehicle and in which a respective roadway for driving through the respective passage region is arranged. Expressed in other words, the respective roadway, on which the workstation, in particular the respective working region or the respective passage region, can be driven through by the respective driverless transport vehicle, is located in the respective passage region of the respective working region.

The respective working region preferably has at least one respective working surface which is arranged next to the respective passage region with respect to the driving direction and on which the manual work can be carried out. The respective working surface is preferably arranged higher in the respective working region than the respective roadway. Expressed in other words, the manual work or the working process can be carried out on the respective working surface while the respective shell part, which is disposed in particular on the respective driverless transport vehicle, is disposed in the respective passage region, in particular on the respective roadway in the respective passage region, or is located in the respective passage region, in particular on the respective roadway. The respective working region is arranged next to the respective roadway with respect to a direction running obliquely or perpendicularly to the driving direction. As a result, the manual work or the working process can be carried out particularly advantageously, in particular in a particularly time-saving and/or particularly economic manner.

The fact that the manual work can be carried out or is carried out on the respective working surface can be understood as meaning in particular that the respective working surface is designed such that at least one person remains on the respective working surface for carrying out the manual work. This means that the person is located on the respective working surface, in particular stands on the respective working surface, while the person is carrying out the manual work on the respective shell part. Therefore, the person when carrying out the manual work is preferably located next to the respective shell component or the respective driverless transport vehicle.

The working surfaces of the workstation preferably face one another. This means that the working surface of the first working region and the working surface of the second working region are arranged facing each other.

The working surfaces of the work station preferably follow one another, in particular directly. This means that the working surface of the first working region and the working surface of the second working region follow one another, in particular directly. As a result, the person can particularly advantageously, in particular with a particular time saving, change between the two working regions in order to carry out the manual work or the working process.

In a further embodiment, it is provided that the respective working region has at least one respective bridge element which is movable, in particular in a translatory and/or rotatory manner, between at least two positions. Expressed in other words, the bridge element of the respective working region is movable relative to the roadway or a wall at least partially delimiting the work station, as a result of which the respective bridge element is movable to and fro between the at least two positions.

In a first of the positions, the respective bridge element is arranged in the passage region, in particular on or over the respective roadway, as a result of which the manual work can be carried out on the respective bridge element. In other words, in the first position, the respective bridge element projects at least partially, in particular completely, into the respective passage region. As a result, the person can carry out the manual work while the person is located on the respective bridge element.

In the second of the positions, the respective bridge element is arranged outside the respective passage region, in particular is spaced apart from the respective passage region, as a result of which the respective passage region can be driven through by the respective driverless transport vehicle. Expressed in other words, in the second position, the respective bridge element, in particular the partial region, is located outside the passage region, as a result of which, in the second position, the respective passage region is free from the respective bridge element. As a result, shell regions of the respective shell component that are disposed upstream and/or downstream of the respective transport vehicle or the respective shell part, in particular with respect to the driving direction of the respective driverless transport vehicle, can be processed particularly advantageously, in particular particularly ergonomically, during the working process.

Preferably, in the first position, the respective passage region is at least partially, in particular completely, blocked by means of or by the respective bridge element, as a result of which driving through the respective passage region by the respective transport vehicle is stopped. Preferably, in the second position, the respective passage region is released by the respective bridge element, as a result of which the respective passage region can be driven through by the respective driverless transport vehicle.

Further features of the invention emerge from the claims, the figures and the description of the figures. The features and combinations of features mentioned above in the description and the features and combinations of features mentioned below in the description of the figures and/or shown by themselves in the figures can be used not only in the respectively stated combination, but also in different combinations or by themselves.

The invention will now be explained in detail using a preferred exemplary embodiment and with reference to the drawings.

BRIEF DESCRIPTION OF THE DRAWINGS

In the figures, identical or functionally identical elements are provided with the same reference signs.

DETAILED DESCRIPTION OF THE DRAWINGS

Figure 1:
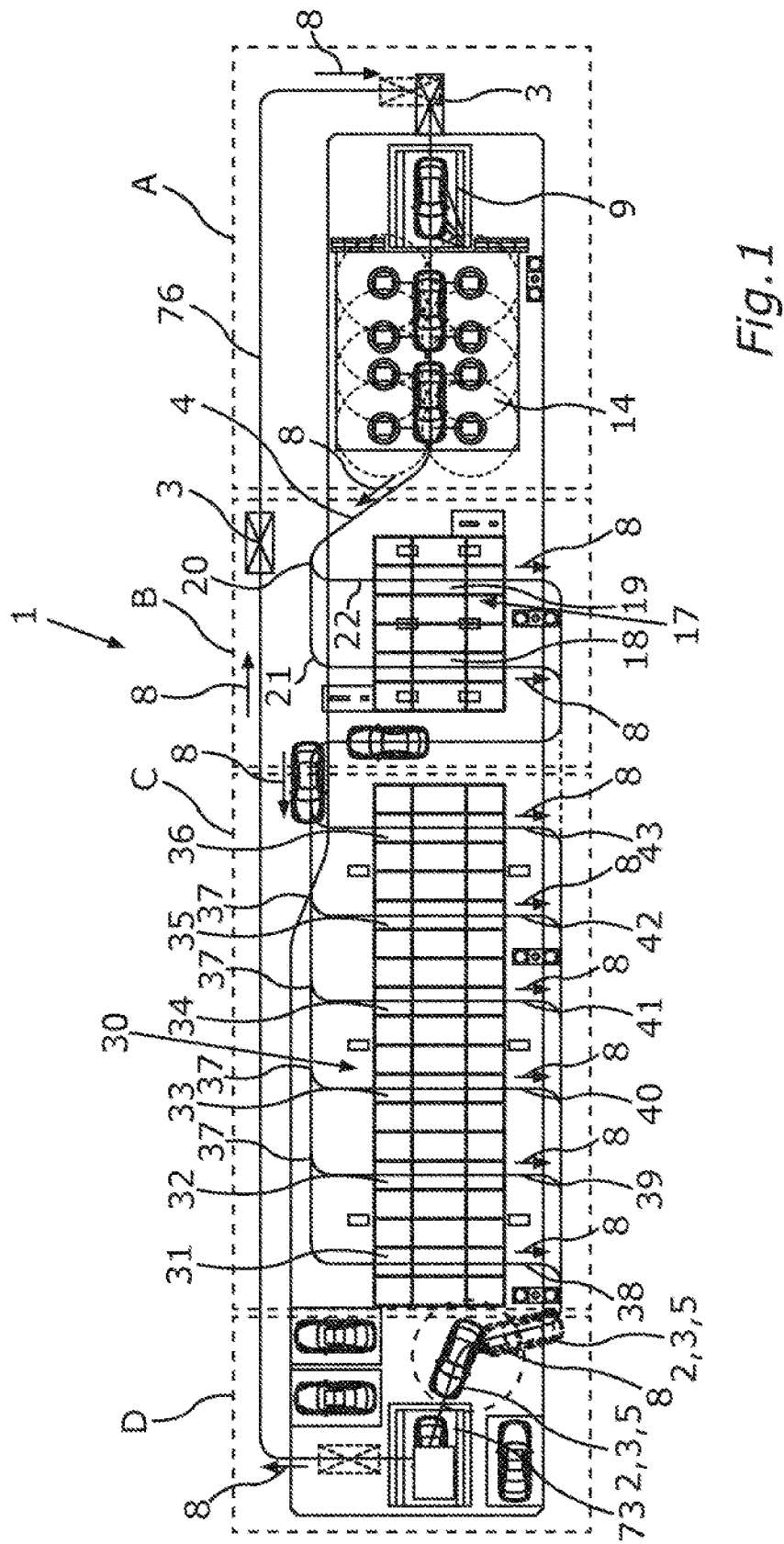
FIG. 1 shows a schematic top view of a production plant according to an embodiment of the invention by means of which a method according to an embodiment of the invention can be carried out.

FIG. 1 shows, in a schematic top view, a production plant 1 for producing shells 2 for a motor vehicle. The production plant 1 is preferably provided for an assembly, referred to in particular as a finish, of the shells 2.

The production plant 1 comprises a plurality of driverless transport vehicles 3 (FTF). For example, the production plant 1 has a driverless transport system (FTS) which comprises the driverless transport vehicles 3. The production plant 1 can be driven through on a travel section 4 by the driverless transport vehicles 3.

Figure 2:
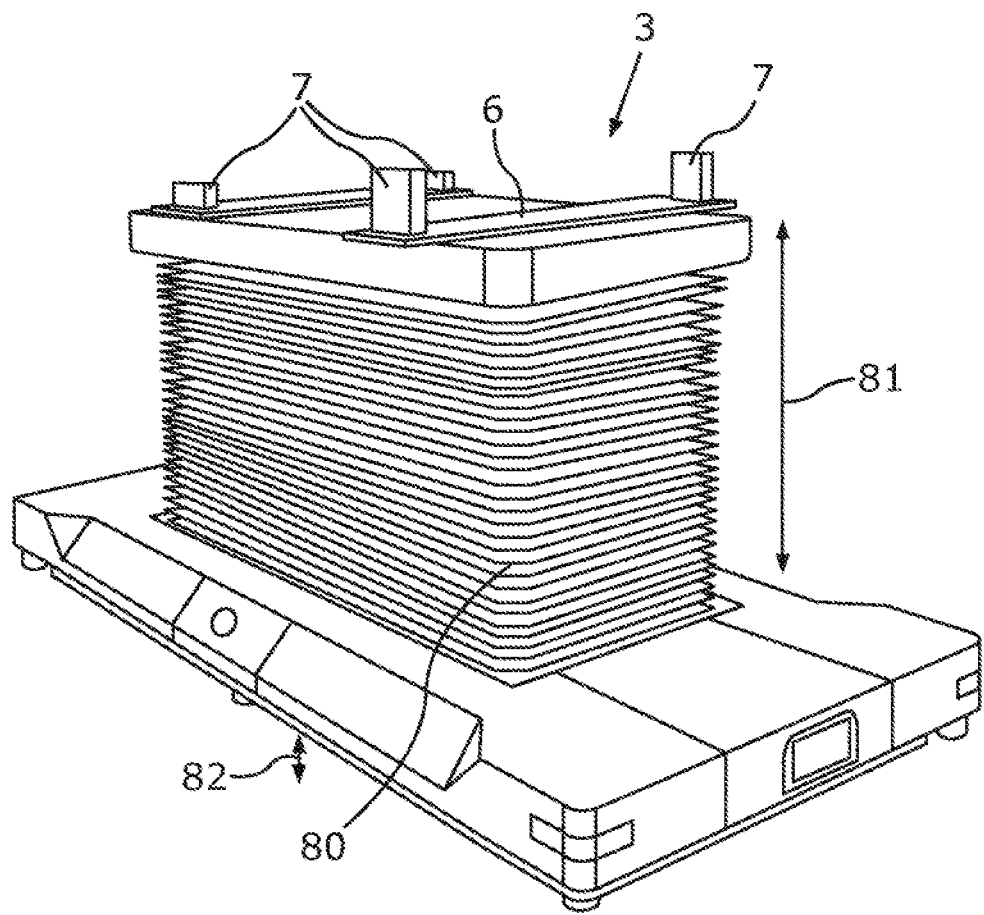
FIG. 2 shows a schematic perspective view of a driverless transport vehicle of a production plant.

FIG. 2 shows, in a schematic perspective view, one of the respective driverless transport vehicles 3. At least one respective shell part 5 of the respective shell 2 can be disposed at or on the respective driverless transport vehicle 3 for conveying the respective shell part 5 through the production plant 1. This means that, in the case of a method for producing the shells 2, at least the respective shell part 5 of the respective shell 2 is disposed at or on the respective driverless transport vehicle 3 and is conveyed through the production plant 1 by means of the respective driverless transport vehicle 3. As shown in FIG. 2, the respective driverless transport vehicle 3 has a receiving region 6 at which the respective shell part 5 can be disposed or can be fastened. For this purpose, at least one receiving element 7 is provided on the receiving region 6.

The driverless transport vehicles 3 drive through the production plant in or along a driving direction 8 which is shown by means of arrows. In the exemplary embodiment shown in FIG. 1, the driverless transport vehicles 3 circulate through the production plant 1. The travel section 4 is therefore designed as a circuit.

The respective driverless transport vehicles 3 can preferably be driven electrically. For example, the respective driverless transport vehicle 3 has an electric machine, by means of which the respective driverless transport vehicle 3 can be driven. The respective driverless transport vehicle 3 preferably has an electric energy store, by means of which electrical energy for the electric machine can be provided, as a result of which the respective driverless transport vehicle 3 can be driven by the electric machine.

The production plant 1 or the driverless transport system preferably has at least one electronic computing device which is referred to in particular as a control system and by means of which the driverless transport vehicles 3 can be controlled or can be guided. The electronic computing device is preferably designed as a programmable logic controller (PLC).

Figure 3:
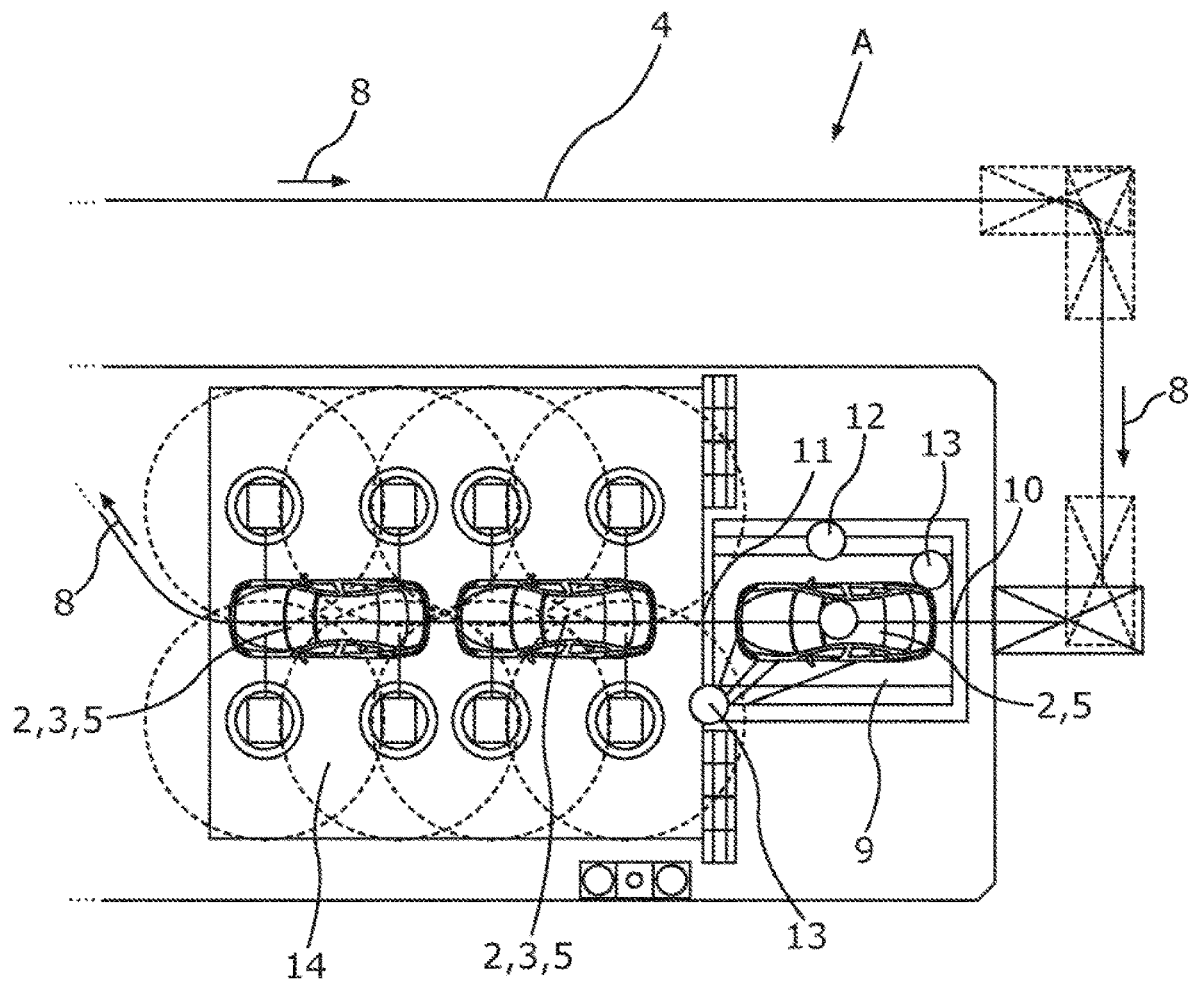
FIG. 3 shows a schematic partial view of a production plant.

FIG. 3 shows a first detailed excerpt A of the production plant 1. FIG. 3 therefore illustrates a schematic partial view of the production plant 1. In the exemplary embodiment shown in FIG. 3, the production plant 1 has a supply device 9, by means of which the respective shell part 5 or the respective shell is disposed at or on the respective driverless transport vehicle 3. The supply device 9 is preferably designed as a lift or as a lifter, by means of which the respective shell part 5 or the respective shell 2 is disposed on the respective driverless transport vehicle 3.

For example, first of all a roll gate opens at an entry 10 of the supply device 9, as a result of which one of the driverless transport vehicles 3 can drive into a supply region of the supply device 9. Subsequently, the driverless transport vehicle 3 drives into the supply region. No shell part 5 is yet disposed on the driverless transport vehicle 3 driving into the supply device 9 or the supply region. The supply device 9 preferably has a load receiving means. The shell part 5 disposed on the load receiving means is preferably lowered by means of the load receiving means with respect to the driverless transport vehicle 3 arranged in the supply region. The shell part 5 is subsequently preferably deposited on the driverless transport vehicle 3. For example, a roll gate then opens an exit 11 from the supply device 9. Subsequently, the driverless transport vehicle 3 drives through the open roll gate and therefore leaves the supply device 9.

An identification device is preferably provided in the supply device 9 or the supply region, by means of which the driverless transport vehicle 3 disposed in the supply region and/or the shell part 5 to be disposed on the respective driverless transport vehicle 3 can be detected or can be identified. Type data are preferably stored in the electronic computing device, that is to say in particular to which of the respective driverless transport vehicles 3 which of the shell parts 5 is assigned. This may be referred to in particular as type integration. Preferably, the type data of the respective driverless transport vehicle 3, in particular after the transfer of the respective shell part 5 by the respective lifter onto the respective driverless transport vehicle 3, can be stored particularly reliably in the electronic computing device.

Preferably, the supply device 9 has a charging point, by means of which the electric energy store of the driverless transport vehicle 3 located in the supply device 9 can be charged.

The supply device 9 preferably has at least one, for example four, proximity switches 12, by means of which a position of the respective driverless transport vehicle 3 in the supply device 9 or the supply region can be detected. As a result, the cycle time can be optimized. For example, the lowering or the disposing of the respective shell part 5 can be coordinated by means of the position, detected by means of the proximity switch 12, of the driverless transport vehicle 3. For example, the lowering can already begin shortly before the respective driverless transport vehicle 3 is located in the supply region. The supply device 9 preferably comprises at least one optical detection device 13, in particular a light barrier or a scanner. The supply region or a lifter region of the lifter is preferably protected by the optical detection device 13. As a result, for example, a collision of the load receiving means or of the respective shell part 5 with an object formed separately from the supply device 9 can be avoided.

Figure 4:
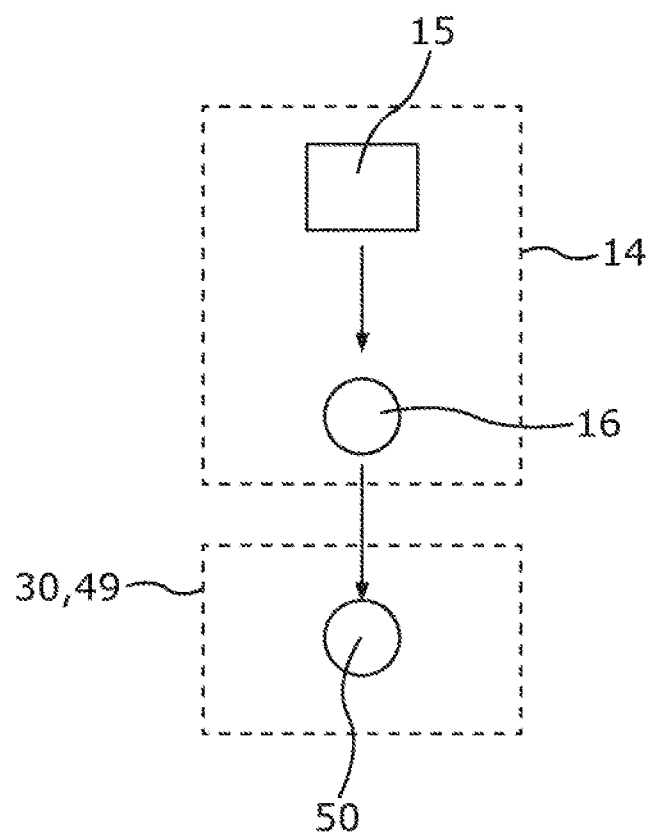
FIG. 4 shows a schematic method diagram of a checking process and a finishing process of a method.

In the exemplary embodiment shown in FIGS. 1 and 3, the supply device 9 is followed, in particular directly, by an inspection region 14 of the production plant 1. In the exemplary embodiment, the production plant 1 therefore has the inspection region 14 which can be driven through by the driverless transport vehicles 3. It is provided in the exemplary embodiment that the respective shell part 5, which is disposed on the respective driverless transport vehicle 3, is introduced or driven into the inspection region 14 of the production plant 1 by means of the respective driverless transport vehicle 3, wherein a production error, in particular surface error, of the shell part 5 on the respective shell part 5, which is introduced into the inspection region 14, is automatically detected. A checking process is therefore carried out in the inspection region 14, in which the production error 15, in particular the surface error, of the respective shell part 5 is automatically detected or determined. The detection 16 is therefore carried out in the inspection region 14. FIG. 4 shows a schematic method diagram in which the checking process is shown.

Figure 5:
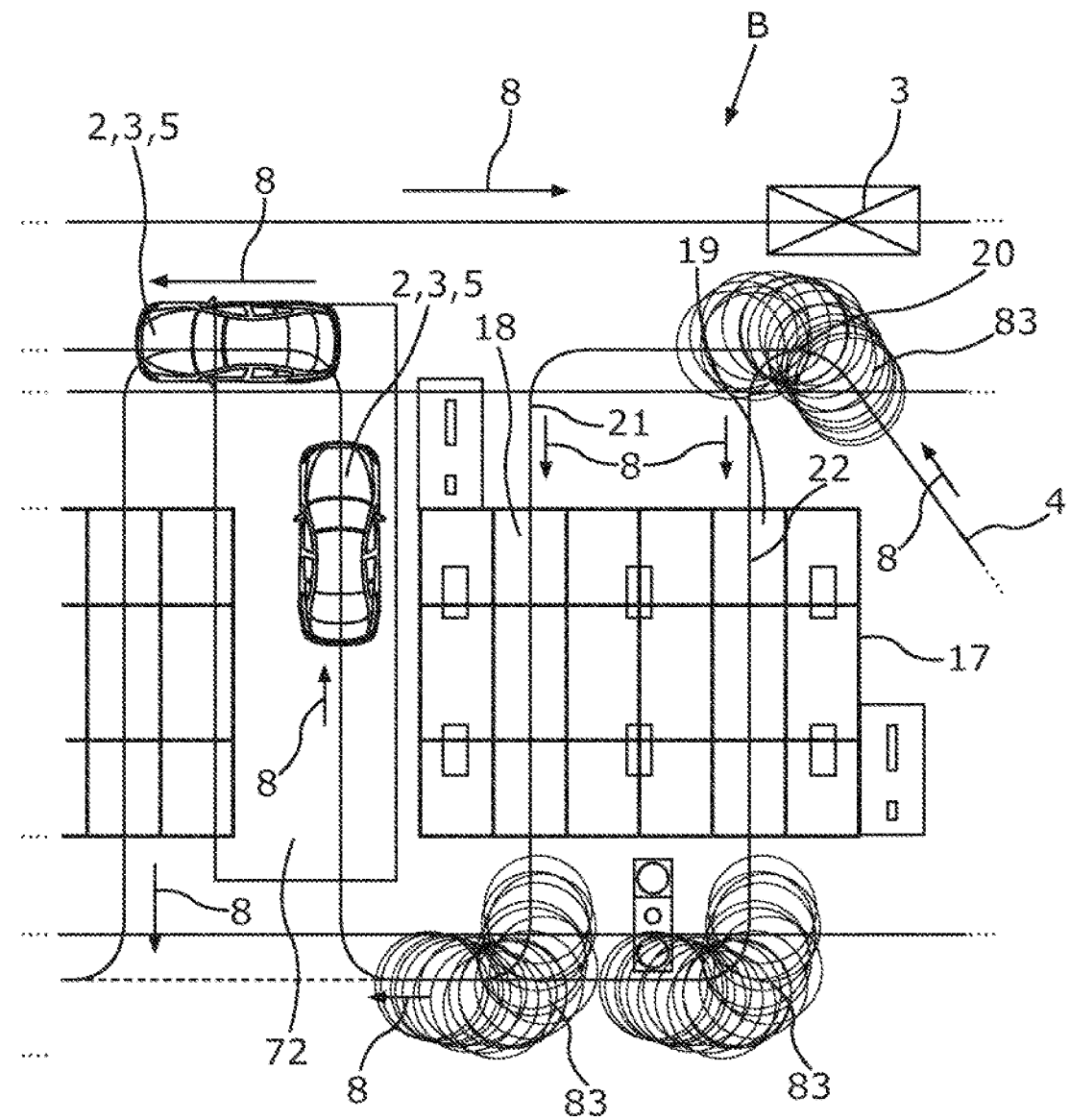
FIG. 5 shows a schematic partial view of a production plant in order to show a workstation.

In order to be able to produce the shells 2 particularly cost-effectively, the production plant 1 has a workstation 17 which has at least two working regions 18, 19 which can be driven through by the driverless transport vehicles 3 parallel to one another. FIG. 5 shows a second schematic detailed excerpt B of the production plant 1, in which the workstation 17 is illustrated. FIG. 5 therefore shows a schematic partial view of the production plant 1. The travel section 4 has a branching point 20 at which the driverless transport vehicles 3 driving through the travel section 4 or the driverless transport vehicles 3 exiting from the inspection region 14 can be divided between two length regions 21, 22 of the travel section 4. The branching point 20 can be understood as meaning in particular a virtual switch. The length regions 21, 22 can be driven through parallel to each other by the driverless transport vehicles 3. A first of the length regions 21 leads through a first of the working regions 18. A second of the length regions 22 leads through a second of the working regions 19.

Figure 6:
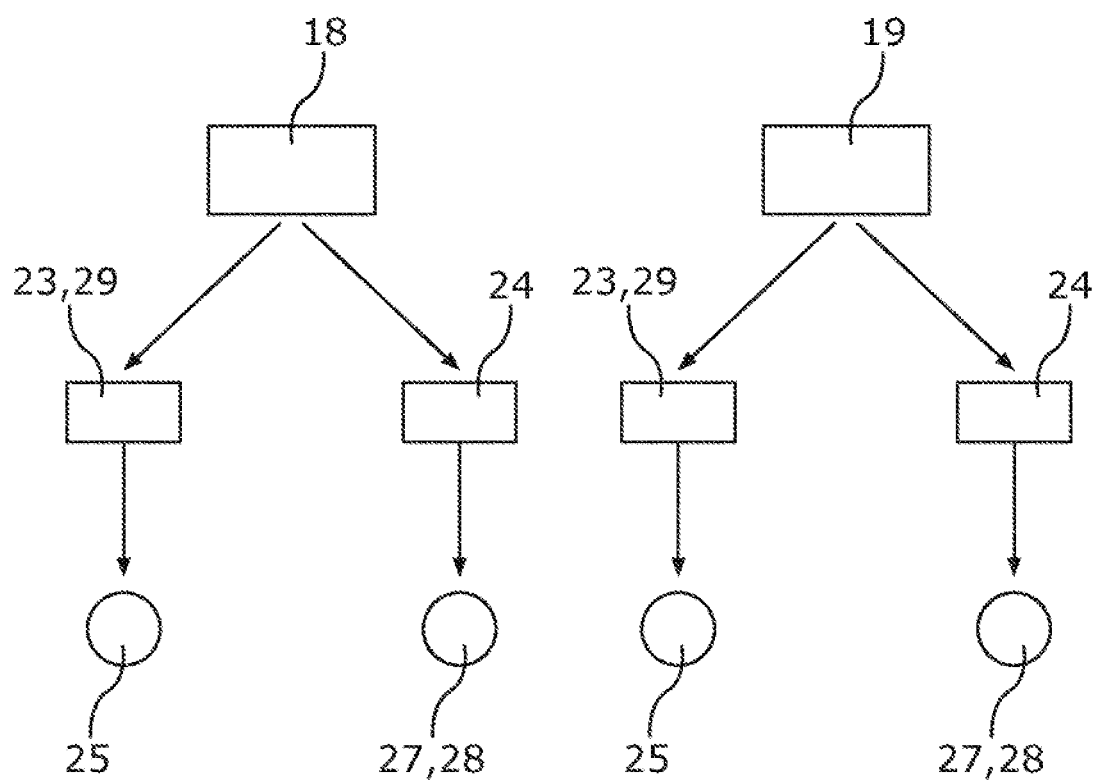
FIG. 6 shows a schematic method diagram of a working process and a changing process of a method.

FIG. 6 shows a schematic method diagram to show a working process 23 and a changing process 24, wherein the working process 23 and the changing process 24 are carried out in the workstation 17. In the working regions 18, 19, in the respective working process 23, at least one item of manual work 25 is carried out in each case on one of the respective shell parts 5, which are introduced into the respective working region 18, 19 by means of the respective driverless transport vehicle 3, in particular disposed at or on the respective driverless transport vehicle 3. This means that the manual work 25 is carried out at least partially by one person 26, in particular by 2 or 3 people. In the working regions 18, 19, in the respective changing process 24, one of the respective shell parts 5, which is disposed on the respective driverless transport vehicle 3, is introduced or driven into, and/or is removed from or driven out of, the respective working region 18, 19 by means of the respective driverless transport vehicle 3. This means that, in the changing process 25, the introduction 27 or the removal 28 of the respective driverless transport vehicles 3 or shell parts 5 is carried out in the respective working region 18, 19. It is provided that, while the working process 23 is being carried out in the first working region 18, the changing process 24 is carried out in the second working region 19, and vice versa. Therefore, while the changing process 24 is being carried out in the first working region 18, the working process 23 is carried out in the second working region 19.

This means that, while the person is carrying out the respective working process 23 in one of the respective working regions 18, 19, the changing process 24 is carried out in the respective other working region 18, 19, as a result of which the person, after finishing the manual work 26 in the one working region 18, 19, can carry out the manual work 25 in the other working region 18, 19 on the shell part 5 introduced there. As a result, an activity of the person, in particular during the manual work 25, can be carried out particularly efficiently, in particular by the fact that a possible waiting time which may arise for the person 26 until the respective driverless transport vehicle 3 or the respective shell part 5 is driven into the respective working region 18, 19 or has left the latter, can be kept particularly low or can be avoided. The shells 2 can thereby be produced particularly cost-effectively.

The respective working process 23 is preferably an assembly process 29, in which, in the respective working region 18, 19, at least one component which is formed separately from the respective shell part 5 is fastened, in particular screwed, to the respective shell part 5, which is introduced into the respective working region 18, 19 by means of the respective driverless transport vehicle 3, in particular is disposed at or on the respective driverless transport vehicle 3. Alternatively or additionally, the respective working process 23 is an assembly process 29, in which, in the respective working region 18, 19, two structural elements, which are formed separately from each other, of the shell part 5, which is introduced into the respective working region 18, 19 by means of the respective driverless transport vehicle 3, are connected to each other, in particular screwed to each other.

For example, during the assembly process 29, at least one screw spindle, for example three screw spindles, is/are installed or mounted with a mount for placing an A pillar screw connection of the shells 2. For example, in the assembly process 24, at least one screw spindle, in particular three screw spindles, is/are installed or mounted with a mount for placing a screw connection of a mirror triangle of the shells 2.

Preferably, at least one identification device is provided in the workstation 17, by means of which the driverless transport vehicle 3 driving into the workstation 17, in particular into the respective working region 18, 19, and/or the shell part 5 to be disposed on the respective driverless transport vehicle 3 can be detected or can be identified.

In the following, the changing process 24 and the working process 23 for a respective driverless transport vehicle 3 or a respective shell part 5 are outlined by way of example: first of all, during the changing process 24, the respective driverless transport vehicle 3 drives into a free one of the working regions 18, 19. As a result, the respective shell part 5 is introduced into the respective free working region 18, 19 by means of the driverless transport vehicle 3. Subsequently, the working process 23, in particular the assembly process 29 and therefore the manual work 25, is carried out on the shell part 5, which has been introduced into the respective working region 18, 19. Screw connections can be carried out or the screw connections can be formed. In the process, for example, tank flaps or charging flaps as structural elements formed separately from the shell part 5 can be fastened, in particular screwed, to the shell part 5. In addition, during the working process 23, operating means of the shell 2 or of the shell part 5 can be installed and/or removed. Individual partial steps of the working process 23 can be carried out in an automated manner or automatically. After the working process 23 has been carried out successfully, further travel of the driverless transport vehicle 3 can be acknowledged. The acknowledgement can take place, for example, manually or automatically. Subsequently, the changing process 24 is carried out, in which the respective driverless transport vehicle 3, which is disposed in the respective working region 18, 19, exits from the respective working region 18, 19 or the workstation 17, as a result of which the respective shell part 5 is removed from the respective working region 18, 19 or the workstation 17.

Figure 7:
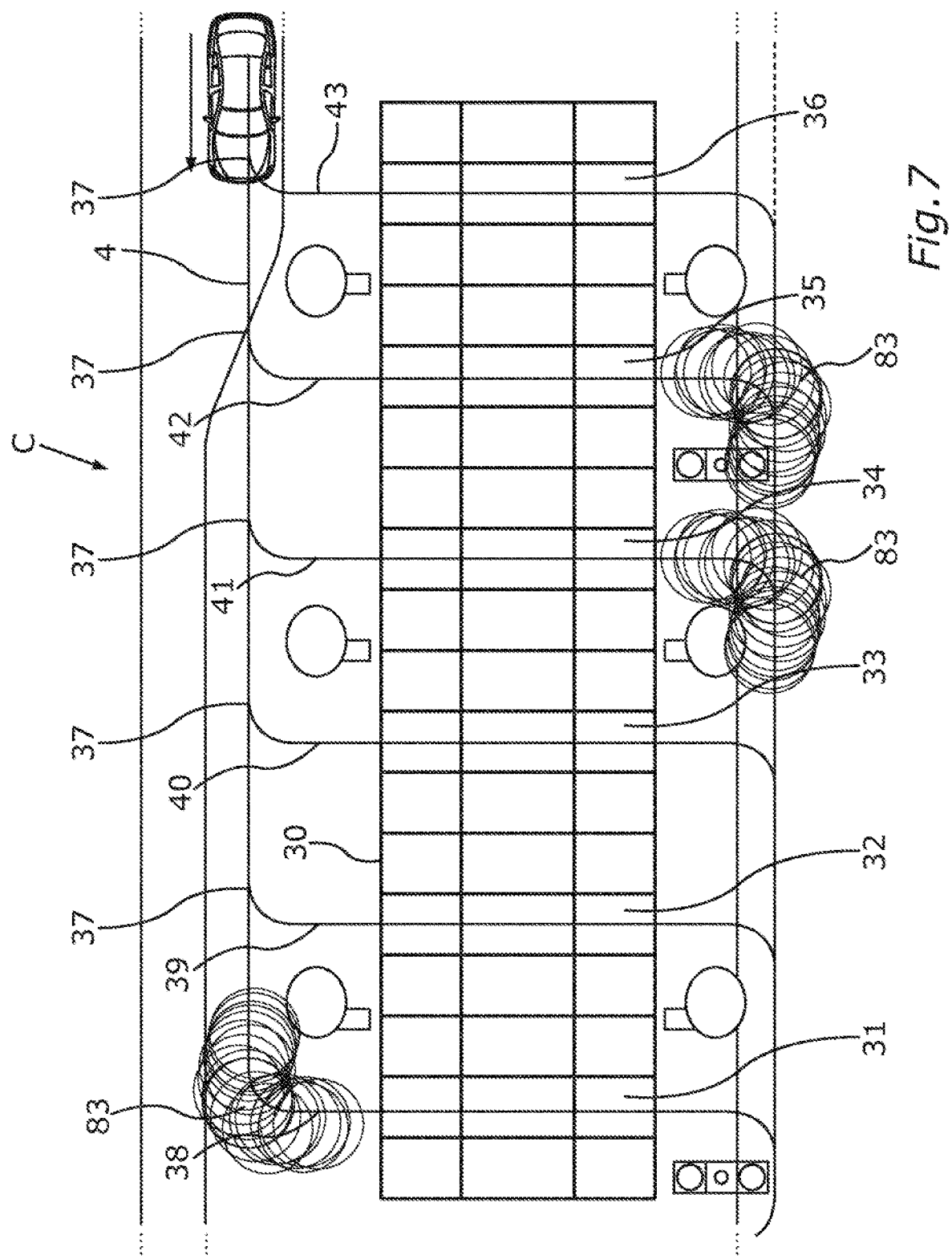
FIG. 7 shows a schematic partial view of a production plant in order to show a second workstation.

In the embodiment shown in FIG. 1, the production plant 1 has a second workstation 30 which is spaced apart from the workstation 17. FIG. 7 shows a third detailed excerpt C of the production plant 1. FIG. 7 therefore shows a schematic partial view of the production plant 1. The second workstation 30 has at least two working areas 31-36 which can be driven through by the driverless transport vehicles 3 parallel to one another. In the exemplary embodiment shown in FIG. 1 and FIG. 7, six of the working areas 31-36 are provided.

The second workstation 30 therefore has six working areas 31-36. The production plant 1 comprises a plurality of second branching points 37, by means of which the driverless transport vehicles 3 driving through the travel section 4 can be divided between six section regions 38 to 43 which can be driven through parallel to one another. A first of the section regions 38 runs through a first of the working areas 31. A second of the section region 39 runs through a second of the working areas 32. A third of the section regions 40 runs through a third of the working areas 33. A fourth of the section regions 41 runs through a fourth of the working areas 34. A fifth of the section regions 42 runs through a fifth of the working areas 35. The sixth of the section regions 43 runs through the sixth of the working areas 36. In the respective working area 31-36, in each case a second working process 44, which is different from the working process 23, and a respective second changing process 45 are carried out.

Figure 8:
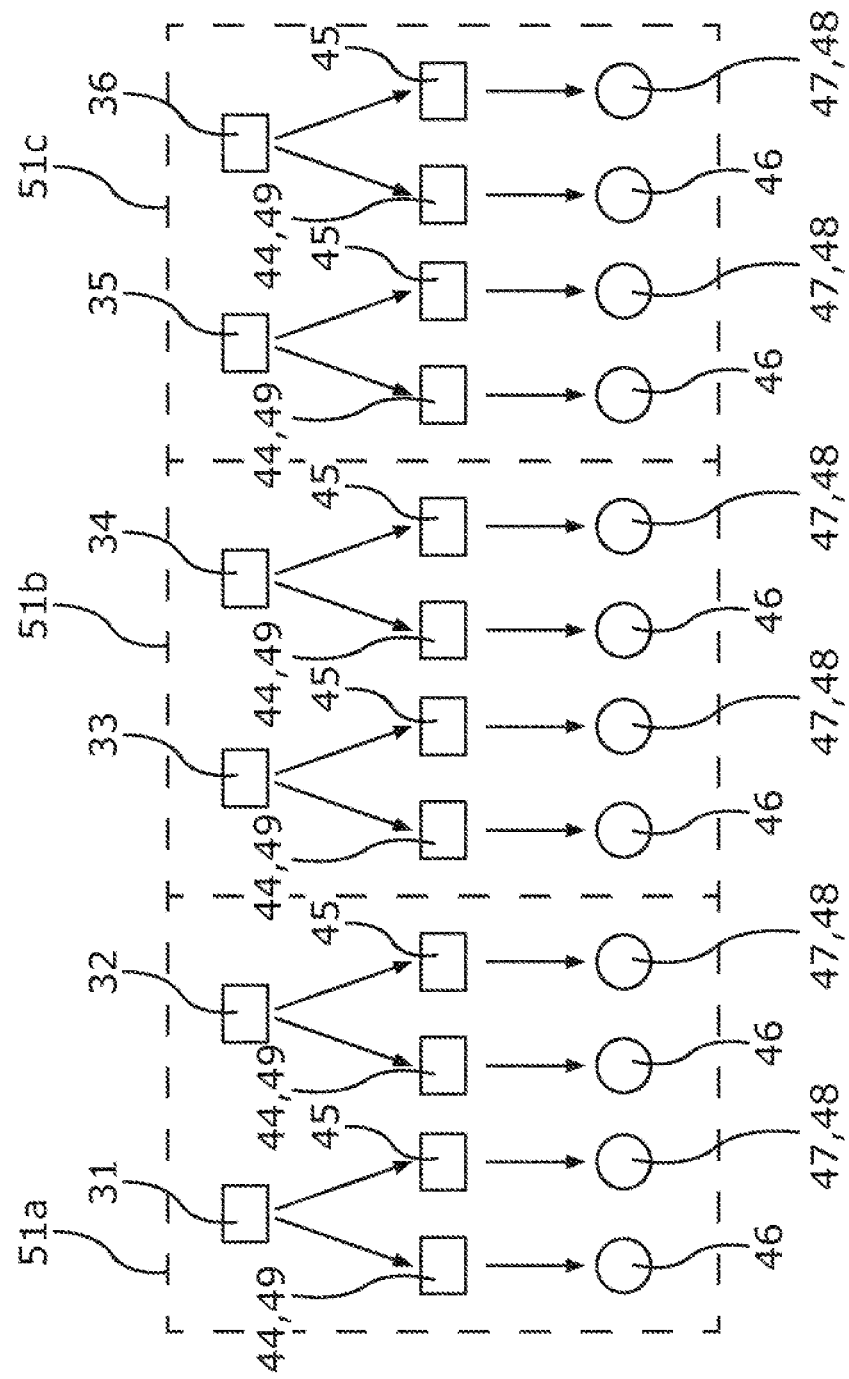
FIG. 8 shows a schematic method diagram of a second working process and a second changing process of a method.

FIG. 8 shows a schematic method diagram, in which the second working process 44 and the second changing process 45 are shown. In the respective working areas 31-36, in the respective second working process 44, a second item of manual work 46, which is in particular different from the manual work 25, is carried out, in particular at least partially, on one of the respective shell parts 5, which are introduced into the respective working area 31-36 by means of the respective driverless transport vehicle 3, in particular disposed at or on the respective driverless transport vehicle 3. In the respective working areas 31-36, in the respective second changing process 45, one of the respective shell parts 5, which is disposed on the respective driverless transport vehicle 3, is introduced into or removed from the respective working area 31-36 by means of the respective driverless transport vehicle 3. Therefore, in the respective second changing process 45, the introduction 47 or the removal 48 of the respective shell parts 5 into the respective working area 31-36 or from the respective working area 31 to 36 is carried out.

While the second working process 44 is being carried out in the first working area 31, the second changing process 45 is carried out in the second working area 32, and vice versa. Therefore, the second changing process 45 is carried out in the first working area 31 while the second working process 44 is being carried out in the second working area 32. While the second working process 44 is being carried out in the third working area 33, the second changing process 45 is carried out in the fourth working area 34, and vice versa. Therefore, the changing process 45 is carried out in the third working area 33 while the second working process 44 is being carried out in the fourth working area 34. While the second working process 44 is being carried out in the fifth working area 35, the second changing process 45 is carried out in the sixth working area 36. Therefore, the second changing process 45 is carried out in the fifth working area 35 while the second working process 44 is being carried out in the sixth working area 36. As a result, the second working process 44 or the second item of manual work 46 can be carried out particularly efficiently in the second workstation 30, in particular analogously to the workstation 17.

Preferably, at least three, in particular six or 9, people 26 are provided carrying out the second item of manual work 46. A first, in particular two or three, of the people 26 carries/carry out the second working process 44 or the second item of manual work 46 in the first and the second working areas 31, 32. A second, in particular two or 3, of the people 26 carries/carry out the second working process 44 or the second item of manual work 26 in the third and the fourth working areas 33, 34. The third, in particular two or 3, of the people 26 carries out the second working process 44 or the second item of manual work 46 in the fifth and sixth working areas 35, 36.

Preferably, the respective second working process 44 is a finishing process 49, in which, in the respective working area 31-36, the detected production error 15, in particular the surface error, on the respective shell part 5, which is introduced into the respective working area 31-36 by means of the respective driverless transport vehicle 3, in particular is disposed on or at the respective driverless transport vehicle 3, is corrected. Therefore, the finishing process comprises correction 50 of the detected production error 15, in particular the surface error. The finishing process 49 is shown in the method diagram shown in FIG. 4. The finishing process 49 is carried out in the second workstation 30 and follows, in particular at least indirectly, the checking process.

It is preferably provided that, in the finishing process 49, the respective production error 15 automatically detected in the inspection region 14, in particular the surface error, is corrected. This means that the automatic detection of the production error 15, in particular the surface error, takes place in the inspection region 14 and the correction 50 of the automatically detected production error 15, in particular the surface error, is carried out in the second workstation 30. As a result, both the detection 16 and the correction 50 of the production error 15 can take place particularly efficiently.

Alternatively, it can be provided that the production plant 1 does not have the inspection region 14 and the detection 16 of the production error 15, in particular the surface error, is carried out in the second workstation 30. This means that, in the finishing process 49, in the respective working area 31-36, the production error 15, in particular the surface error, is detected, for example manually, on the respective shell part 5, which is introduced into the respective working area 31-36 by means of the respective driverless transport vehicle 3, in particular is disposed at or on the respective driverless transport vehicle 3. As a result, the inspection region 14 can be omitted, and therefore, for example, a construction space of the production plant 1 can be kept particularly small.

Preferably, at least one identification device is provided in the workstation 17, by means of which the driverless transport vehicle 3 driving into the second workstation 44, in particular into the respective working area 31-36, and/or the shell part 5 to be disposed on the respective driverless transport vehicle 3 can be detected or can be identified.

Preferably, a charging point is arranged in each case in the respective working area 31-36, at which the electrical energy store of the respective driverless transport vehicle 3 can be charged or is charged. Preferably, an optical display device 58 is arranged in the respective working area 31-36, by means of which the production error 15 which is automatically detected in the inspection region 14 can be displayed or is displayed to the respective person 26.

Preferably, a suction device is provided in or for the respective working area 31-36. Dust, in particular grinding dust, arising during the correction 50 can be sucked off by means of the suction device. For example, the dust is aluminum dust. The dust can therefore be brought about from aluminum processing within the scope of the correction 50. The suction device is preferably designed as a manual suction device, for example as a vacuum cleaner. The suction device is preferably designed to be able to be used in a zone at risk of explosion. This may be referred to in particular as an explosion-proof suction device.

The second changing process 45 and the second working process 44 are outlined by way of example below: a respective driverless transport vehicle 3 located upstream of the second workstation 30 on the travel section 4 drives into a free one of the working areas 31-36. It can be provided here that the respective driverless transport vehicle can be parked upstream of the second workstation 30 in a waiting queue of driverless transport vehicles 3 until one of the respective working areas 31-36 is free for the entry of the driverless transport vehicle 3. Subsequently, first of all the second changing process 45 is carried out. Therefore, the respective shell part 5 is introduced into the free one of the respective working areas 31-36 by means of the respective driverless transport vehicle 3. The second working process 44 is subsequently carried out in the respective working area 31-36. This means that the production error 15 is corrected by the second item of manual work 46 being carried out. Subsequently, further travel of the driverless transport vehicle 3 arranged in the respective working area 31-36 or the shell part 5 can be acknowledged. This can be carried out automatically or by the person 26. For example, individual error entries to be processed during the correction 50 and characterizing individual ones of the production errors 15 can be acknowledged individually. Subsequently, the respective driverless transport vehicle 3 exits from the respective working area 31-36, as a result of which the respective shell part 5 is moved out of the respective working area 31-36 or the second workstation 30 by means of the respective driverless transport vehicle 3.

Figure 9:
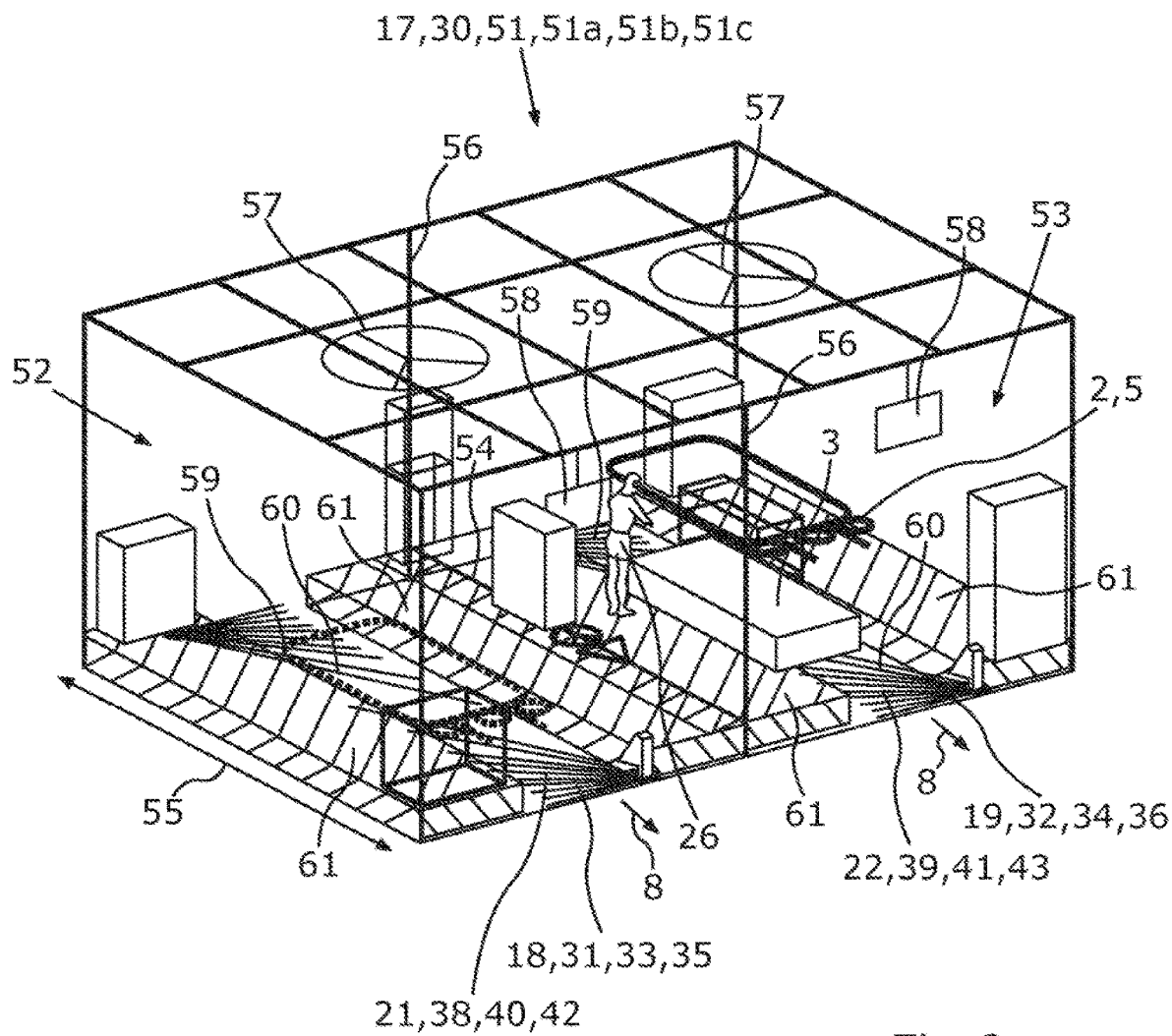
FIG. 9 shows a schematic perspective view of a workstation of a production plant.

Preferably, the workstation 17 is in the form of a double box 51 or the workstation 17 comprises the double box 51. FIG. 9 shows such a double box 51 in a schematic perspective view. FIG. 9 therefore shows the workstation 17 in a schematic perspective view.

Alternatively or additionally, the second workstation 30 can comprise at least one double box 51, in particular three double boxes 51. For example, a first of the double boxes 51a comprises the first and the second working areas 31, 32. For example, a second of the double boxes 51b comprises the third and the fourth working areas 33, 34. For example, the third of the double boxes 50c comprises the fifth and the sixth working areas 35, 36. Therefore, the double box 51, 51a-c shown in FIG. 9 is a respective one of the double boxes 50a-c of the second workstation 30. FIG. 9 can therefore show a schematic and perspective partial view of the second workstation 30. The respective double box 51, 51a-c can therefore be provided for carrying out the manual work 25 as far as carrying out the second item of manual work 46. The double boxes 51, 51a-c preferably in each case have a similar, in particular identical, design.

The respective double box 51, 51a-c has a first half 52 and a second half 53. For example, the first half 52 comprises the first working region 18 or the first working area 31 or the third working area 33 or the fifth working area 35. For example, the second half 53 comprises the second working region 19 or the second working area 32 or the fourth working area 34 or the sixth working area 36.

Preferably, no partition is provided between the first half 52 and the second half 53. This means that an open passage 54 which can be stepped through by the person 26 is located between the first half 52 and the second half 53. A width of the passage 54 preferably at least predominantly corresponds to a longitudinal extent 55 of the respective double box 51, 51a-c, the longitudinal extent extending in the driving direction 8 of the driverless transport vehicles 3. Owing to the fact that the respective double box 51, 51a-c has the passage 54, the double box 51, 51a-c may be referred to in particular as an open box. This can be realized, for example, by virtue of the fact that in each case at least one support 56, in particular steel support, can be arranged at edge regions of the double box 51, 51*a*-*c*. For example, the passage 54 is delimited by two of the supports 56.

The respective double box 51, 51*a*-*c* preferably has at least one illumination device. For example, an illumination strength of the illumination device is 500 lux. The illumination device is preferably arranged on the support 56. For example, each of the halves 52, 53 has at least one of the illumination devices. For example, the respective illumination device is in the form of a light or illumination panel.

Preferably, at least one ventilation device 57, referred to in particular as a fan, is arranged in each of the halves 52, 53. The respective ventilation device 57 is arranged, for example, on a respective ceiling element of the respective half 52, 53.

Preferably, the respective half 52, 53 in each case has the optical display device 58, by means of which information about the carrying out of the manual work 26 or the second item of manual work 45 can be displayed or is displayed to the person 26. The optical display device 58 is preferably in the form of a display or in the form of a monitor. The optical display device 58 can be understood as meaning in particular an optical output device.

Preferably, the respective double box 51, 51*a*-*c* has at least one entry which can be stepped through by the person 26, with at least one step being provided at the entry, as a result of which the person 26 can step through the entry particularly comfortably or particularly safely.

The working surfaces 61 of the workstation 17 preferably face one another. The working surfaces 61 of the first and the second working areas 31, 32 preferably face one another. The working surfaces 61 of the third and the fourth working areas 33, 34 preferably face one another. The working surfaces 61 of the fifth and the sixth working areas 35, 36 preferably face one another.

Preferably, the working surfaces 61 of the first working region 18 and of the second working region 18 follow one another, in particular directly. Preferably, the working surfaces 61 of the first working area 31 and of the second working area 32 follow one another, in particular directly. Preferably, the working surfaces 61 of the third working area 33 and of the fourth working area 34 follow one another, in particular directly. Preferably, the working surfaces 61 of the fifth working area 35 and of the sixth working area 36 follow one another, in particular directly.

Figure 10:
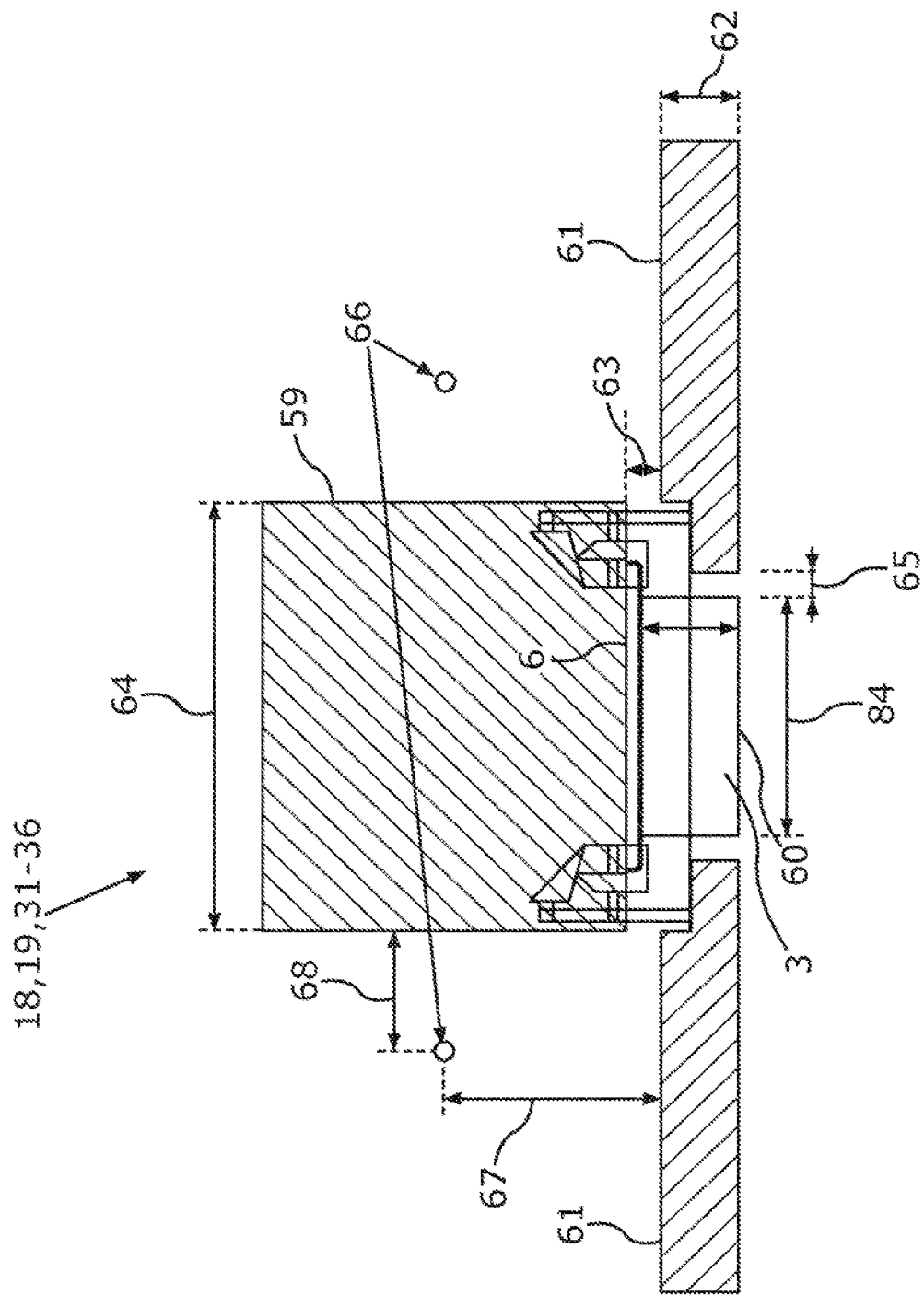
FIG. 10 shows a schematic partial sectional view of a workstation of a production plant.

FIG. 10 shows one of the working regions 18, 19 in a schematic partial sectional view. Features of FIG. 10 can likewise be transferred to the respective working areas 31-36. This means that a schematic partial sectional view of one of the respective working areas 31-36 can be shown in FIG. 10. The respective working region 18, 19 or the respective working area 31-36 has a respective passage region 59 which can be driven through by the respective driverless transport vehicle 3 in the driving direction 8 and in which a respective roadway 60 for driving through the respective passage region 59 is arranged. In addition, the respective working region 18, 19 or the respective working area 31-36 has at least one respective working surface 61 which is arranged next to the respective passage region 59 or the roadway 60 with respect to the driving direction 8. The manual work 26 or the second item of manual work 45 can be carried out on the respective working surface 61. This means that the person 26 is located on the respective working surface 61 for carrying out the manual work 26 or the second item of manual work 45 while the person 26 is carrying out the manual work 25 or the second item of manual work 46. The respective working surface 61 in the respective working region 18, 19 or in the respective working area 31-36 is arranged higher than the respective roadway 60. As a result, the person 26 can carry out the manual work 25 or the second item of manual work 46 particularly ergonomically.

The respective working surface 61 preferably comprises at least one platform, referred to in particular as a worker platform, or the respective working surface 61 is in the form of a platform. For example, a height 62 of the working surface above the roadway 60 is 330 millimeters.

The working surface 61 is arranged, for example, lower than the receiving region 6 of the driverless transport vehicle 3 if the driverless transport vehicle 3 is located in the respective working region 18, 19 or in the respective working area 31-36. A vertical distance 63 between the working surface and the receiving region 6 is, for example, 5 millimeters.

A passage width 64 of the passage region 59 is, for example, 800 millimeters. For example, a respective horizontal distance 65, which is, for example, 100 millimeters, is provided on either side between the driverless transport vehicle 3, which is arranged in the respective working region 18, 19 or the respective working area 31-36.

Preferably, at least one optical detection device 66 is arranged in the respective working region 18, 19 or in the respective working area 31-36, by means of which an obstacle, located in the passage region 59 or on the roadway 60, for the driverless transport vehicle 3 can be detected. As a result, it can be detected, for example, if the person 26 is located in the passage region 59 or on the roadway 60, wherein then the changing process 24 or the second changing process 45 stops. As a result, safety for the person 26 can be particularly increased. The optical detection device 66 is preferably in the form of a light barrier.

Preferably, an acoustic output device is provided by means of which an acoustic signal can be output or is output if the optical detection device 66 detects the obstacle in the passage region 59 or in the roadway 60. As a result, the person 26 can be particularly advantageously, in particular particularly safely, warned about the driverless transport vehicle 3.

For example, the optical detection device 66 is arranged above the working surface 61 in the vertical direction. For example, a vertical distance 67 which is, for example, 900 millimeters, can be provided between the optical detection device 66 and the working surface 61. For example, the optical detection device 66 is spaced apart horizontally from the passage region 59, wherein a horizontal distance 68, which is preferably 500 millimeters, can be provided in the horizontal direction between the optical detection device 66 and the passage region 59.

Figure 11:
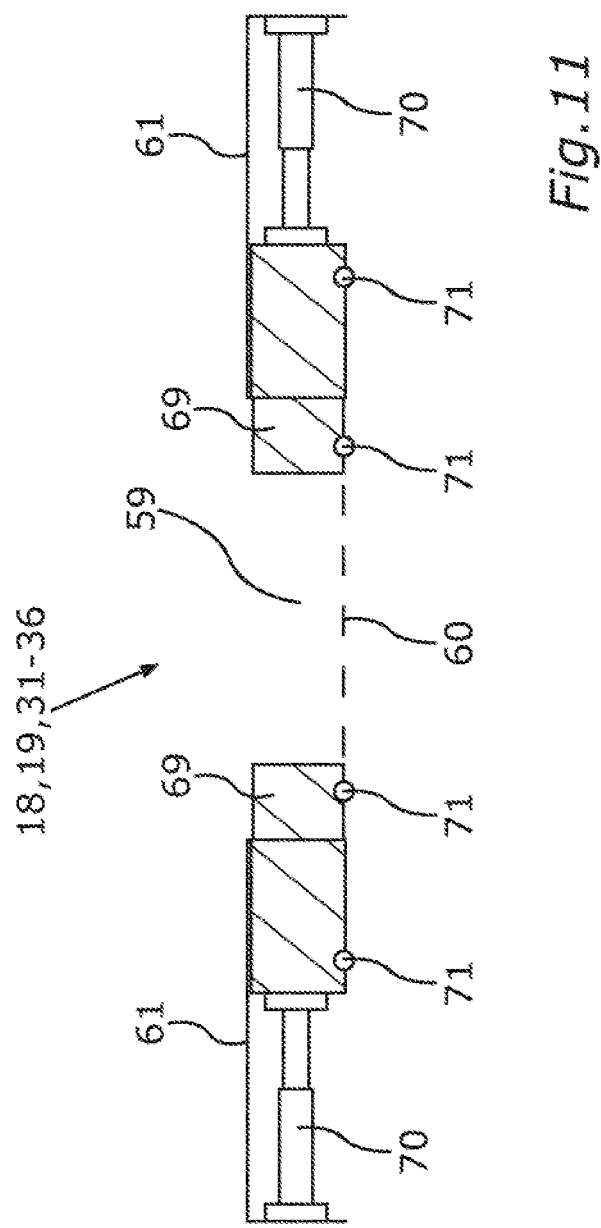
FIG. 11 shows a schematic partial sectional view of a workstation of a production plant according to a further embodiment of the invention.

FIG. 11 shows, in a schematic partial sectional view, one of the working regions 18, 19 or one of the working areas 31-36 according to a further embodiment of the production plant 1. In the embodiment shown in FIG. 11, the respective working region 18, 19 or the respective working area 31-36 has at least one respective bridge element 69 which is movable between at least two positions. In the embodiment shown in FIG. 11, two of the bridge elements 69 are provided. In a first of the positions, the respective bridge element 69 is arranged in the passage region 59, as a result of which the manual work 25 or the second item of manual work 46 can be carried out on the respective bridge element 69. This means that the person 26 is located on the respective bridge element 69 for carrying out the manual work 25 or the second item of manual work 46 while the person 26 is carrying out the manual work 25 or the second item of manual work 46. The passage region 59 is at least partially, in particular completely, blocked by the respective bridge element 69, which is in the first position. As a result, the passage region 59 cannot be driven through by the respective driverless transport vehicle 3. In the second of the positions, the respective bridge element 69 is arranged outside the passage region 59, as a result of which the passage region 59 is free from the respective bridge element 69. As a result, the respective passage region 59 is released from the respective bridge element, and therefore the respective passage region 59 can be driven through by the respective driverless transport vehicle 3. The changing process 24 or the second changing process 45 can therefore be carried out while the respective bridge element is in the second position. The working process 23 or the second working process 44 can be carried out while the respective bridge element 69 is in the first position. As a result, the person 26, via the respective bridge element 69, when the latter is in the first position, can particularly simply and/or particularly ergonomically reach partial regions of the shell part 5 for or when carrying out the manual work 25 or the second item of manual work 46, wherein the partial regions can be arranged upstream and/or downstream of the driverless transport vehicle 3 with respect to the driving direction 8 while the driverless transport vehicle 3 is located in the respective working region 18, 19 or the respective working area 31-36.

In the exemplary embodiment shown in FIG. 11, a respective pressure cylinder 70 is provided, by means of which the bridge element 69 is movable to and fro between the positions. In the exemplary embodiment, the respective bridge element 69 has wheels 71, by means of which the respective bridge element 69 driven by the pressure cylinder 70 is movable in a translatory manner on the roadway 60.

In the exemplary embodiment shown in FIG. 5, the production plant 1 has a buffer region 72. The buffer region 72 can be driven through by the driverless transport vehicles 3. The buffer region 72 is arranged, with respect to the travel section 4, in the travel section 4 between the workstation 17 and the second workstation 30, in particular the second branching points 37, as a result of which the driverless transport vehicles 3 driving through the workstation 17 drive via the buffer region 72 to the second workstation 30, in particular the second branching point 37. By means of the buffer region 72, the manual work 25 can be at least partially, in particular at least indirectly, decoupled from the second item of manual work 46. As a result, a throughput of the driverless transport vehicles 3 driving through the production plant 1 or of the shells 2 produced by means of the production plant 1 can be particularly increased or kept particularly high.

In the exemplary embodiment shown in FIG. 1, the production plant 1 has a removal device which is spaced apart from the workstations 17, 30, the inspection region 14 and the buffer region 72 and by means of which the shell parts 5, which are disposed at or on the respective driverless transport vehicle 3, can be removed from the respective driverless transport vehicle 3. As a result, the respective shell parts 5 can be removed from the production plant 1.

Figure 12:
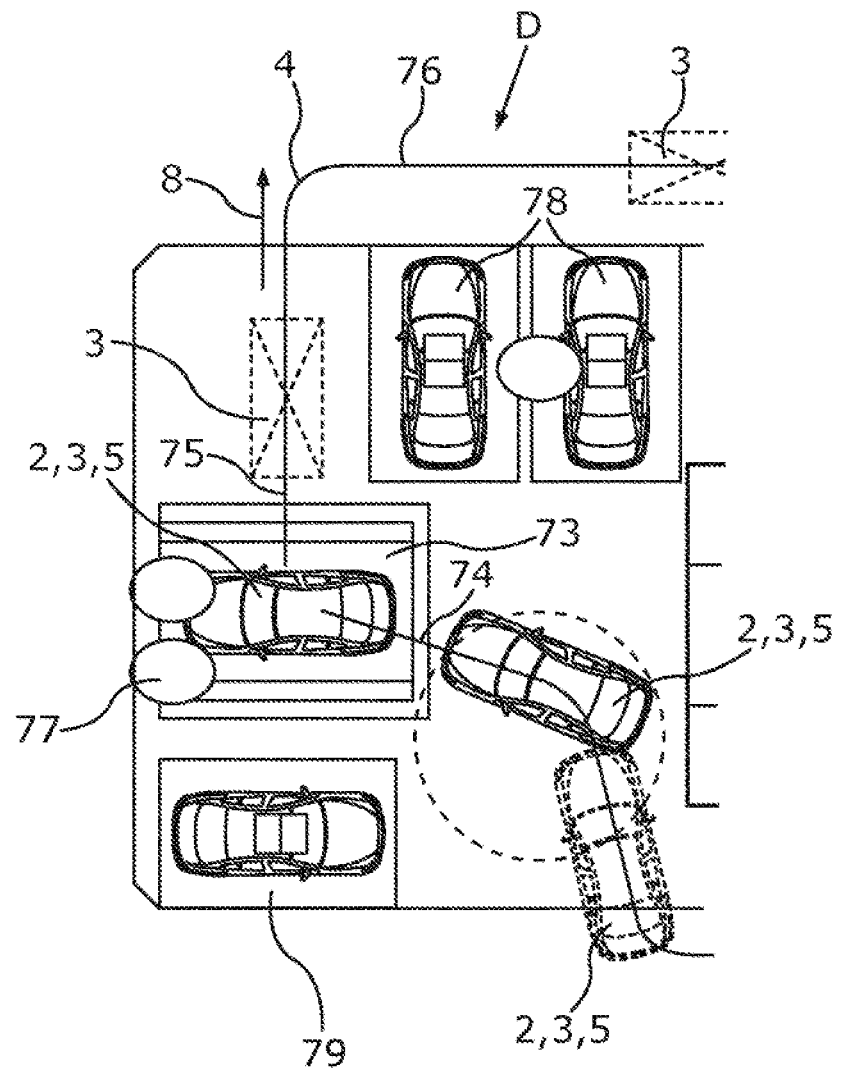
FIG. 12 shows a schematic partial view of a production plant for showing a starting region and a maintenance region.

FIG. 12 shows a fourth detailed excerpt D of the production plant 1. FIG. 12 therefore shows a schematic partial view of the production plant 1. FIG. 12 illustrates the removal device 73. The removal device 73 is preferably designed as a lift or as a lifter. This means that the respective shell part 5, which is disposed on the respective driverless transport vehicle 3, can be raised by means of the lifter and can thereby be removed from the respective driverless transport vehicle 3 and can be transported away by means of the lifter.

The removal device 73 preferably has a removal region which can be driven through by the driverless transport vehicle 3. For example, the driverless transport vehicle 3, on which the respective shell part 5 is disposed, drives into the removal region. The driverless transport vehicle 3 when driving into the removal region or the removal device 73 drives through at the entrance 74 of the removal device 73.

The driving in of the driverless transport vehicle 3 is preferably carried out while a load receiving means of the lifter is lowered, in particular to half height. For example, the load receiving means is lowered with respect to the driverless transport vehicle 3 or the shell part 5 when the driverless transport vehicle 3 is driven into the removal region or is positioned in the removal region. Subsequently, the respective shell part 5 is picked up from the load receiving means and raised, in particular to half height, relative to the driverless transport vehicle 3. The load receiving means is preferably lifted further or completely while the driverless transport vehicle 3 is exiting from the removal region or leaving the removal region.

Subsequently, the driverless transport vehicle 3 leaves the removal device 73 via an exit 75 of the removal device 73 and goes on to a return path to the supply device 9 via a return section 76, bypassing the workstation 17, in particular the second workstation 30 and the inspection region 14. None of the shell parts 5 is disposed on the respective driverless transport vehicle 3. The method can subsequently be run through again.

A detection device is preferably provided in the removal device 73 or the removal region, by means of which the driverless transport vehicle 3, which is disposed in the supply region, and/or the shell part 5, to be disposed on the respective driverless transport vehicle 3, can be detected or can be identified.

The removal device 73 preferably has at least one, for example 4, proximity switches 77, by means of which a position of the driverless transport vehicle 3 in the removal device 73 or the removal region can be detected. As a result, the cycle time of the driverless transport vehicles 3 can be optimized. For example, it can be detected by means of the proximity switch 77 when the respective driverless transport vehicle 3 is in the removal region or in its position provided for this purpose, as a result of which the load receiving means is lowered further from the half height in order to be able to receive the shell part 5.

Preferably, the production plant 1 has at least one maintenance region 78, in particular two maintenance regions 78. An inspection or maintenance of the respective shell part 5 can be carried out in the respective maintenance region 78. In addition, finishing work to the respective shell part 5 can optionally be carried out in the respective maintenance region 78. The production plant 1 can have an audit region 79, in particular for process optimization.

Preferably, a driving speed of the respective driverless transport vehicle 3 on a straight section is at least 1 meter per second. A driving speed of the respective driverless transport vehicle 3 on a curve which, for example, can have a radius of 1 meter, is preferably at least 0.3 meter per second.

The respective driverless transport vehicle 3 is designed to be able to carry out forward travel and backward travel. The respective driverless transport vehicle 3 is designed to be able to rotate on the spot. This means that a rotation of the driverless transport vehicle 3, by means of which a change in direction of the driverless transport vehicle 3 can be brought about is possible while forward travel or the backward travel is stopped.

The respective driverless transport vehicle 3 preferably comprises a lifting device 80 by means of which the receiving region 6 can be lowered and can be raised. As a result, a height adjustment of the receiving region 6 can be realized. The receiving region 6 is preferably vertically adjustable by means of the lifting device 8 in a height 81 which is, for example, 1100 millimeters. The lifting device 80 may be referred to in particular is an integrated lifting table. An adjustment speed of the lifting device 80 is preferably at least 150 millimeters per second, in particular 200 millimeters per second. Expressed in other words, a lifting speed of the integrated lifting table, in the vertical direction, is at least 150 millimeters per second, in particular 200 millimeters per second. An operating device, in particular an operator control panel, is preferably provided, by means of which the height adjustment by means of the lifting device 80 can be set or can be predetermined.

Preferably, lane guidance of the driverless transport vehicles 3, in particular on the travel section 4, is possible in the production plant 1 without floor fittings over the entire section, in particular at exposed points. Preferably, positioning accuracy of the driverless transport vehicles 3 is at maximum plus/minus 10 millimeters in the course of the section or in the travel section 4 and at maximum plus/minus 5 millimeters in the exposed points, for example at the lifter.

The driverless transport vehicle 3 is preferably manually movable or displaceable in the event of a defect or an emergency situation. For example, in the event of a breakdown of the production plant 1 or of the driverless transport vehicles 3, a free travel controller is provided for the driverless transport vehicles 3.

The production plant 1 or the driverless transport system preferably comprises at least 16 of the driverless transport vehicles 3. The production plant 1 can preferably be configured flexibly in such a way that the travel section 4 can be extended as desired, for example by means of additional stations. The travel section 4 is preferably at maximum 1000 m in length. A service life of the driverless transport vehicles 3 in the production plant 1 is preferably six weeks at maximum. A charging option for the driverless transport vehicles 3 is preferably provided at respective stopping points in the travel section 4 or the production plant 1.

Preferably, the electronic computing device, by means of which the driverless transport vehicles can be controlled, is formed separately from the driverless transport vehicles 3. This means that the respective driverless transport vehicles 3 do not have an individual controller arranged in the respective driverless transport vehicles 3, but rather are controlled centrally via the electronic computing device. The electronic computing device is therefore designed as an independent plant computer which makes a master control of the driverless transport vehicles 3 possible.

Preferably, the driverless transport vehicles 3 are connected or connectable to the electronic computing device electronically or so as to transmit data, in particular wirelessly. The electronic connection is preferably realized by means of WLAN, in particular five gigahertz I-WLAN.

The production plant 1 preferably has at least one second electronic computing device formed separately from the electronic computing device. The second electronic computing device can be designed as an SPS. For example, different systems or processes of the production plant 1 are controlled or regulated by means of the second electronic computing device of the driverless transport vehicles 3 or the driverless transport system. The electronic computing device is preferably connected or connectable via a defined interface to the second electronic computing device electronically or so as to transmit data. This can be realized, for example, by means of a PNPN coupling. The second electronic computing device may be referred to in particular as a plant SPS of the production plant 1.

For example, a ground clearance 82 between the driverless transport vehicle 3 and the roadway 60 is 115 millimeters. The ground clearance 82 can be understood as meaning in particular a vertical distance between the driverless transport vehicle 3 and the roadway 60.

Curve radii of curves of the travel section 4 are designed such that the curve can be driven through by the driverless transport vehicle 3, on which the respective shell part 5 is disposed. This is shown by means of envelope curves 83 of the shell part 5 or the shell 2.

A load capacity of the respective driverless transport vehicle 3 is preferably at least 500 kg. A width 84 of the respective driverless transport vehicle 3 is preferably at maximum 150 millimeters wide.

LIST OF REFERENCE SIGNS 1 production plant
2 shells
3 driverless transport vehicle
4 travel section
shell part
6 receiving region
7 receiving element
8 driving direction
9 supply device
10 entry
11 exit
12 proximity switch
13 optical detection device
14 inspection region
15 production error
16 detection
17 workstation
18 first working region
19 second working region
20 branching point
21 first length region
22 second length region
23 working process
24 changing process
25 manual work
26 person
27 introduction
28 removal
29 assembly process
30 second workstation
31 first working area
32 second working area
33 third working area
34 fourth working area
35 fifth working area
36 sixth working area
37 second branching point
38 first section region
39 second section region
40 third section region
41 fourth section region
42 fifth section region
43 sixth section region 44 second working process
45 second changing process
46 second item of manual work
47 introduction
48 removal
49 finishing process
50 correction
51 double box
51a first double box
51b second double box
51c third double box
52 first half
53 second half
54 passage
55 longitudinal extent
56 support
57 ventilation device
58 optical display device
59 passage region
60 roadway
61 working surface
62 height
63 vertical distance
64 passage width
65 horizontal distance
66 optical detection device
67 vertical distance
68 horizontal distance
69 bridge element
70 pressure cylinder
71 wheels
72 buffer region
73 removal device
74 entrance
75 exit
76 return section
77 proximity switch
78 maintenance region
79 audit region
80 lifting device
81 height
82 ground clearance
83 envelope curve
84 width

The invention claimed is:

1. A method for producing shells for a motor vehicle, in which at least one respective shell part of a respective shell is disposed on a respective driverless transport vehicle and is conveyed through a production plant via the respective driverless transport vehicle, the method comprising:
a workstation of the production plant has at least two working regions which are driven through parallel to one another by the driverless transport vehicles and in which, in each case during a respective working process, manual work is carried out on one of the respective shell parts introduced into the respective working region via the respective driverless transport vehicle and, during a respective changing process, one of the respective shell parts disposed on the respective driverless transport vehicle is introduced into or removed from the respective working region via the respective driverless transport vehicle, wherein,
while the working process is being carried out in a first of the working regions, the changing process is carried out in the second of the working regions, and vice versa.

2. The method according to claim 1, wherein
the respective working process is an assembly process, in which, in the respective working region, at least one component formed separately from the respective shell part is fastened to the respective shell part, which is introduced into the respective working region via the respective driverless transport vehicle, and/or two structural elements, which are formed separately from each other, of the respective shell part, which is introduced into the respective working region via the respective driverless transport vehicle, are connected to each other.

3. The method according to claim 1, wherein
a second workstation of the production plant, which second workstation is spaced apart from the workstation, has at least two working areas which are driven through parallel to one another by the driverless transport vehicles and in which, in each case during a respective second working process different from the working process, second manual work is carried out on one of the respective shell parts, which is introduced into the respective working area via the respective driverless transport vehicle, and,
during a respective second changing process, one of the respective shell parts, which is disposed on the respective driverless transport vehicle, is introduced into or removed from the respective working area via the respective driverless transport vehicle, wherein,
while the second working process is carried out in a first of the working areas, the second changing process is carried out in the second of the working areas, and vice versa.

4. The method according to claim 3, wherein
the respective second working process is a finishing process, in which, in the respective working area, at least one detected production error on the respective shell part, which is introduced into the respective working area via the respective driverless transport vehicle, is corrected.

5. The method according to claim 4, wherein
in the finishing process, in the respective working area, the production error on the respective shell part, which is introduced into the respective working area via the respective driverless transport vehicle, is detected.

6. The method according to claim 4, wherein
the respective shell part, which is disposed on the respective driverless transport vehicle, is introduced by the respective driverless transport vehicle into an inspection region of the production plant formed separately from the working region, and
a production error on the respective shell part, which is introduced into the inspection region, is automatically detected.

7. The method according to claim 6, wherein
in the finishing process, the respective production error detected in the inspection region is corrected.

8. The method according to claim 1, wherein
the respective shell part, which is disposed on the respective driverless transport vehicle, is introduced by the respective driverless transport vehicle into an inspection region of the production plant formed separately from the working region, and
a production error on the respective shell part, which is introduced into the inspection region, is automatically detected.

* * * * *